(12) United States Patent
Ma et al.

(10) Patent No.: US 8,614,003 B2
(45) Date of Patent: *Dec. 24, 2013

(54) SUPERHYDROPHOBIC POLY(DIMETHYLSILOXANE) AND METHODS FOR MAKING THE SAME

(71) Applicant: Peking University, Beijing (CN)

(72) Inventors: Hongwei Ma, Beijing (CN); Tongcheng Qian, Beijing (CN); Yuanzi Wu, Beijing (CN)

(73) Assignee: Peking University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,638

(22) Filed: Jan. 11, 2013

(65) Prior Publication Data

US 2013/0129982 A1    May 23, 2013

Related U.S. Application Data

(63) Continuation of application No. 12/529,217, filed as application No. PCT/CN2008/071944 on Aug. 11, 2008, now Pat. No. 8,367,214.

(51) Int. Cl.
 *B32B 27/08* (2006.01)
 *B05D 7/04* (2006.01)

(52) U.S. Cl.
 USPC ............. 428/447; 427/407.1; 427/412.1; 428/451

(58) Field of Classification Search
 USPC ............. 427/407.1, 412.1; 428/447, 451
 See application file for complete search history.

(56) References Cited

U.S. PATENT DOCUMENTS

| | | | |
|---|---|---|---|
| 3,004,959 | A | 10/1961 | Finnegan et al. |
| 4,153,641 | A | 5/1979 | Deichert et al. |
| 6,770,599 | B2 | 8/2004 | Yanagi et al. |
| 2007/0237947 | A1 | 10/2007 | Gleason et al. |
| 2009/0130059 | A1 | 5/2009 | Sun et al. |

FOREIGN PATENT DOCUMENTS

| | | |
|---|---|---|
| CN | 1810912 A | 8/2006 |
| GB | 2 082 584 | 3/1982 |
| WO | WO-2004/090065 | 10/2004 |
| WO | WO-2004/108708 | 12/2004 |
| WO | WO-2005/084191 | 9/2005 |
| WO | WO-2010/017671 | 2/2010 |
| WO | WO-2010/022564 | 3/2010 |
| WO | WO-2010/022565 | 3/2010 |

OTHER PUBLICATIONS

Elbert, D. L. et al., "Surface Treatments of Polymers for Biocompatibility," Annu. Rev. of Mater. Sci., vol. 26, 1996, pp. 365-394.

(Continued)

*Primary Examiner* — D. S. Nakarani
(74) *Attorney, Agent, or Firm* — Foley & Lardner LLP; James F. Ewing

(57) ABSTRACT

A hydrophobic coating having a contact angle of at least about 150 degrees is disclosed herein, which coating comprises: a polymer substrate comprising a first linker incorporated therein at a specified surface density of from about $3 \times 10^{-4}$ to about $9 \times 10^{-8}$ units per $nm^2$; a first polymer layer in contact with said first linker; a second linker in contact with said first polymer layer; and a second polymer layer in contact with said second linker. Also disclosed herein are methods for producing the hydrophobic coating. This hydrophobic coating is useful for making microfluidic devices having a hydrophobic coating on the microfluidic channels, as well as other uses in the field of microfluidics.

20 Claims, 6 Drawing Sheets

(56) References Cited

OTHER PUBLICATIONS

Erbil, H. Y., "Transformation of a Simple Plastic into a Superhydrophobic Surface," Science, 2003, vol. 299, Issue: 5611, pp. 1377-1380.
Gau et al., "Liquid Morphologies on Structured Surfaces: From Microchannels to Microchips,"Science, 1999, vol. 283, Issue 5398, pp. 46-49.
Huang, Y., "Solvent resistant microfluidic DNA synthesizer," Lab Chip, 2007, vol. 7, Issue: 1, pp. 124-126.
Lafuma, A., and Quéré, D., "Superhydrophobic states," Nature Materials, 2003, vol. 2, Issue: 7, pp: 457-460.
Ma, H., et al., "Surface-Initiated Atom Transfer Radical Polymerization of Oligo(ethylene glycol) Methyl Methacrylate from a Mixed Self-Assembled Monolayer on Gold," Advanced Functional Materials, 2006, vol. 16, Issue: 5, pp. 640013648.
Makamba, Honest et al., "Surface modification of poly(dimethylsiloxane) microchannels,"Electrophoresis, vol. 24, No. 21, 2003, pp. 3607-3619.
Tsujii, Y, et al., "Structure and properties of high-density polymer brushes prepared by surface-initiated living radical polymerization," Surface-Initiated Polymerization I, 2006, vol. 197, pp. 1-45.
Atencia et al., "Controlled microfluidic interfaces," Nature 2005, vol. 437, Issue: 7059, pp. 648-655.
Besson, E. et al., "A Novel and Simplified Procedure for Patterning Hydrophobic and Hydrophilic SAMS for Microfluidic Devices by Using UV Photolithography," Langmuir (2006), vol. 22, No. 20, pp. 8346-8352, American Chemical Society.
Donzel, C., et al., "CHydrophilic Poly(dimethylsiloxane) Stamps for Microcontact Printing," Advanced Materials, 2001, vol. 13, Issue: 15, pp. 1164-1167.
El-Ali, Jamil et al., "Cells on chips," Nature, vol. 442, Jul. 27, 2006, pp. 403-411.
Elbert, D. L. et al., "Surface Treatments of Polymers for Biocompatibility," Annu. Rev. of Mater. Sci., vol. 26, 1996, pp. 365-94.
Erbil, H. Y., "Transformation of a Simple Plastic into a Superhydrophobic Surface," Science, 2003, vol. 299, Issue: 5611, pp: 1377-1380.
Gau et al., "Liquid Morphologies on Structured Surfaces: From Microchannels to Microchips," Science, 1999, vol. 283, Issue 5398, pp. 46-49.
Genzer et al., "Recent developments in superhydrophobic surfaces and their relevance to marine fouling: a review," Biofouling, 2006, vol. 22, Issue 5, pp. 339-360.
Genzer, J., and Efimenko, K., "Creating Long-Lived Superhydrophobic Polymer Surfaces Through Mechanically Assembled Monolayers," Science 2000, vol. 290, Issue: 5499, pp. 2130-2133.
Granick, S., et al., "Slippery questions about complex fluids flowing past solids," Nature Materials, 2003, vol. 2, Issue: 4, pp. 221-227.
Gudipati, C. S. et al., "The Antifouling and Fouling-Release Performance of Hyperbranched Fluoropolymer (HBFP)-Poly(ethylene glycol) (PEG) Composite Coatings Evaluated by Adsorption of Biomacromolecules and the Green Fouling Alga Ulva," Langmuir; Am. Chem.Soc., vol. 21, No. 7, 2005, pp. 3044-3053.
He, B., et al., "Multiple Equilibrium Droplet Shapes and Design Criterion for Rough Hydrophobic Surfaces," Langmuir, 2003, vol. 19, Issue: 12, pp: 4999-5003.
He, J., "Study and Application of a Linear Frequency-Thickness Relation for Surface Initiated Atom Transfer Radical Polymerization in Quartz Crystal Microbalance," Macromolecules, 2007, vol. 40, Issue: 9, pp. 3090-3096.
Huang, Bo et al., "Counting Low-Copy Number Proteins in a Single Cell," Science, vol. 315, No. 5, Jan. 5, 2007, pp. 81-84.
Huang, Bo et al., "Use of a Mixture of n-Dodecyl-β-d-maltoside and Sodium Dodecyl Sulfate in Poly(dimethylsiloxane) Microchips to Suppress Adhesion and Promote Separation of Proteins," Anal. Chem., vol. 79, No. 23, 2007, pp. 9145-9149.
Huang, Y., "Solvent resistant microfluidic DNA synthesizer," Lab Chip, 2007, vol. 7, Issue: 1, pp: [[124-126]] 24-26.

International Preliminary Report on Patentability for Intl. Pat. Appln. No. PCT/CN2008/071944, dated Feb. 15, 2011, 6 pp.
International Preliminary Report on Patentability for Intl. Pat. Appln. No. PCT/CN2008/072205, dated Mar. 1, 2011, 6 pp.
International Preliminary Report on Patentability for Intl. Pat. Appln. No. PCT/CN2008/072206, dated Mar. 1, 2011, 6 pp.
International Search Report and Written Opinion issued in PCT/CN2008/071944, mailed May 28, 2009.
International Search Report for Intl. Pat. Appln. No. PCT/CN2008/072205, mailed Jun. 11, 2009, 4 pp.
International Search Report for Intl. Pat. Appln. No. PCT/CN2008/072206, mailed on Jun. 18, 2009, 4 pp.
Jin, M., et al., "Super-Hydrophobic PDMS Surface with Ultra-Low Adhesive Force," Macromolecular Rapid Communications, 2005, vol. 26, Issue: 22, pp. 1805-1809.
Lafuma, A., and Quéré, D., "Superhydrophobic states," Nature Materials, 2003, vol. 2, Issue: 7, pp. 457-460.
Lee, Bong Soo et al., "Surface-Initiated, Atom Transfer Radical Polymerization of Oligo(ethylene glycol) Methyl Ether Methacrylate and Subsequent Click Chemistry for Bioconjugation," Biomacromolecules, vol. 8, No. 2, 2007, pp. 744-749.
Li, X.M., et al., "What do we need for a superhydrophobic surface? A review on the recent progress in the preparation of superhydrophobic surfaces," Chemical Society Reviews, 2007, vol. 36, Issue 8, pp. 1350-1368.
Liu, Y., et al., "Dynamic Coating Using Polyelectrolyte Multilayers for Chemical Control of Electroosmotic Flow in Capillary Electrophoresis Microchips," Analytical Chemistry, 2000, vol. 72, Issue: 24, pp. 5939-5944.
Ma, H., et al., "Protein Resistant Polymer Coatings on Silicon Oxide by Surface-Initiated Atom Transfer Radical Polymerization," Langmuir, vol. 22, Issue 8, pp. 3751-3752, 2006.
Ma, H., et al., "Surface-Initiated Atom Transfer Radical Polymerization of Oligo(ethylene glycol) Methyl Methacrylate from a Mixed Self-Assembled Monolayer on Gold," Advanced Functional Materials, 2006, vol. 16, Issue: 5, pp. 640-648.
Ma, Hongwei et al., "Applications of Surface Initiated Polymerization in Surface Modification of Biomaterials: an Ultra-low Initiator Density Strategy," Abstracts of the 26th Chinese Chemical Society Congress, Part 3: 07-O-022, Jul. 13-16, 2008.
Makamba, Honest et al., "Surface modification of poly(dimethylsiloxane) microchannels," Electrophoresis, vol. 24, No. 21, 2003, pp. 3607-3619.
Marmur, Abraham, "The Lotus Effect: Superhydrophobicity and Metastability," Langmuir, Am. Chem. Soc., 2004, pp. 3517-3519.
Non-Final Office Action for U.S. Appl. No. 12/529,229, mailed on Mar. 21, 2011, 5 pp.
Non-Final Office Action on U.S. Appl. No. 12/529,217, mailed Feb. 1, 2012.
Notice of Allowance for U.S. Appl. No. 12/529,231, mailed on Sep. 16, 2011, 8 pp.
Notice of Allowance for U.S. Appl. No. 12/529,229, mailed on May 31, 2011, 5 pp.
Notice of Allowance on U.S. Appl. No. 12/529,217, mailed Oct. 4, 2012.
Notice of Allowance on U.S. Appl. No. 12/529,217, mailed May 23, 2012.
Olah, A., et al., "Hydrophobic recovery of UV/ozone treated poly(dimethylsiloxane): adhesion studies by contact mechanics and mechanism of surface modification," Applied Surface Science, 2005, vol. 239, Issue: 3-4, pp. 410-423.
Psaltis, Demetri et al., "Developing optofluidic technology through the fusion of microfluidics and optics," Nature, vol. 442, Jul. 27, 2006, pp. 381-386.
Rolland, J. P., et al., "Solvent-Resistant Photocurable 01CLiquid Teflon01D for Microfluidic Device Fabrication," Journal of the American Chemical Society, 2004, vol. 126, Issue: 8, pp. 2322-2323.
Roman, Gregory T., et al., "Sol-Gel Modified Poly(dimethylsiloxane) Microfluidic Devices with High Electroosmotic Mobilities and Hydrophilic Channel Wall Characteristics," Anal. Chem, vol. 77, 2005, pp. 1414-1422.

(56) References Cited

OTHER PUBLICATIONS

Shah, Rahul R. et al., "Using Atom Transfer Radical Polymerization to Amplify Monolayers of Initiators patterned by Microcontact Printing into Polymer Brushes for Pattern Transfer," Macromolecules, vol. 33, 2000, pp. 597-605.

Song, Helen et al., "On-Chip Titration of an Anticoagulant Argatroban and Determination of the Clotting Time within Whole Blood or Plasma Using a Plug-Based Microfluidic System," Anal. Chem., vol. 78, No. 14, Jul. 15, 2006, pp. 4839-4849.

Sun, Manhui et al., "Artificial Lotus Leaf by Nanocasting," Langmuir vol. 21, 2005, pp. 8978-8981.

Sun, T. et al., "Bioinspired Surfaces with Special Wettability," Accounts of Chemical Research, 2005, vol. 38, Issue: 8, pp. 644-652.

Takei et al., Tuning microchannel wettability and fabrication of multiple-step LaPlace valves, Lab Chip, 2007, vol. 7, Issue 5, pp. 596-602.

Toepke, M. W. et al., "PDMS absorption of small molecules and consequences in microfluidic applications," Lab Chip, vol. 6, The Royal Society of Chemistry, 2006, pp. 1484-1486.

Tsujii, Y., et al., "Structure and properties of high-density polymer brushes prepared by surfaceinitiated living radical polymerization," Surface-Initiated Polymerization I, 2006, vol. 197, pp. 1-45.

Whitesides, George M. et al., "The origins and the future of microfluidics," Nature, vol. 442, Jul. 27, 2006, pp. 368-373.

Written Opinion of the International Searching Authority for Intl. Pat. Appln. No. PCT/CN2008/072206, mailed on Jun. 18, 2009, 5 pp.

Written Opinion of the International Searching Authority for Intl. Pat. Appln. No. PCT/NC2008/072205, mailed on Jun. 11, 2009, 5 pp.

Wu, Yuanzi et al., "A Facile Method for Permanent and Functional Surface Modification of Poly(dimethylsiloxane)," J. Am. Chem. Soc., vol. 129, No. 23, 2007, pp. 7226-7227.

Xia, Younan et al., "Soft Lithography," Angew. Chem. Int. Ed., vol. 37, 1998, pp. 550-575.

Xiao, Deqing et al., "Chemical Modification of the Surface of Poly(dimethylsiloxane) by Atom-Transfer Radical Polymerization of Acrylamide," Langmuir, vol. 18, No. 25, Am. Chem. Soc., 2002, pp. 9971-9976.

Yu, X., et al., "Reversible pH-Responsive Surface: From Superhydrophobicity to Superhydrophilicity," Advanced Materials, 2005, vol. 17, Issue: 10, pp. 1289-1293.

Zhang et al., "Superhydrophobic surfaces: from structural control to functional application," Journal of Materials Chemistry, 2008, vol. 18, pp. 621-633.

Zhao, B, et al., "Surface-directed liquid flow inside microchannels," Science, 2001, vol. 291, Issue: 5506, pp. 1023-1026.

Zheng, Yongmei et al., "Directional adhesion of superhydrophobic butterfly wings," Soft Matter, vol. 3, The Royal Society of Chemistry, 2007, pp. 178-182.

US 8,614,003 B2

SUPERHYDROPHOBIC POLY(DIMETHYLSILOXANE) AND METHODS FOR MAKING THE SAME

CROSS-REFERENCE TO RELATED APPLICATIONS

This application is a continuation of U.S. patent application Ser. No. 12/529,217, filed Aug. 31, 2009, which is the U.S. National Stage of Patent Cooperation Treaty Application No. PCT/CN2008/071944 filed on Aug. 11,2008, both of which are hereby incorporated by Reference in their entirety.

FIELD

Disclosed herein is a hydrophobic coating having a contact angle of at least about 150 degrees and methods for making the same. Also disclosed are uses for the hydrophobic coating such as in microfluidic devices.

BACKGROUND

Superhydrophobic surfaces have many important applications in naturally occurring systems and in artificial devices, which applications have inspired intensive research activities with regard to the preparation methods and theoretical modeling (Zhang, X., et al., *J. Mater. Chem.* 2008, 18, 621-633, Li, X. M., et al., *Chem. Soc. Rev.* 2007, 36, 1350-1368, Genzer, J., et al., *Biofouling* 2006, 22, 339-360, Sun, T. L., et al., *Acc. Chem. Res.* 2005, 38, 644-652). It is of particular interest to create superhydrophobic surface inside a microfluidic channel. This is important in a number of applications and fundamental studies, such as fluidic flow control in microfluidic devices (Gau, H., et al., *Science* 1999, 283, 46-49, Takei, G., et al., *Lab Chip* 2007, 7, 596-602) and fluidic behavior study (Atencia, J., et al., *Nature* 2005, 437, 648-655). Poly(dimethyl siloxane) (PDMS) is the most commonly used material in the fabrication of microfluidic devices (Whitesides, G. M. *Nature* 2006, 442, 368-373, Psaltis, D., et al., *Nature* 2006, 442, 381-386).

SUMMARY

In general, disclosed herein are superhydrophobic coatings as well as methods for preparing the superhydrophobic coatings. The methods disclosed herein utilize a relayed surface-initiated polymerization (SIP) strategy to produce superhydrophobic surfaces. It has been found that an ultra low initiator density can be used to prepare a superhydrophobic surface. Three factors are optimized to achieve the superhydrophobic surfaces. These factors are the ultra low initiator density, the relayed SIP strategy, and a hydrophobic monomer as disclosed herein.

Disclosed herein is a hydrophobic coating having a contact angle of at least about 150 degrees, which coating comprises:
a polymer substrate comprising a first linker incorporated therein at a specified surface density of from about $3 \times 10^{-4}$ to about $9 \times 10^{-8}$ units per $nm^2$;
a first polymer layer in contact with said first linker;
a second linker in contact with said first polymer layer; and
a second polymer layer in contact with said second linker.

Also disclosed is a hydrophobic coating having a contact angle of at least about 150°, which coating comprises:
a poly(dimethyl) siloxane substrate comprising a first linker incorporated therein at a surface density of from about $3 \times 10^{-4}$ to about $9 \times 10^{-8}$ units per $nm^2$;
a polyether layer in contact with said first linker;
a second linker in contact with said polyether layer; and
a fluorinated polymer layer in contact with said second linker.

Also disclosed is a method of making a hydrophobic coating having a contact angle of at least about 150 degrees, said method comprising:
1) providing a polymer substrate wherein a first linker is incorporated into the substrate at a surface density of from about $3 \times 10^{-4}$ to about $9 \times 10^{-8}$ units per $nm^2$;
2) contacting a monomer with said first linker under first polymerizing conditions to provide a first polymer layer bound to the polymer substrate through the first linker;
3) contacting a second linker with said first polymer layer under reaction conditions to provide a reactive surface; and
4) contacting a monomer with said reactive surface under second polymerizing conditions to provide the hydrophobic coating.

Also disclosed is a method for making a hydrophobic coating having a contact angle of at least about 150 degrees, said method comprising:
1) polymerizing a mixture comprising a poly(dimethyl-methylvinylsiloxane) prepolymer, poly(dimethyl-methylhydrogensiloxane) precursors and undec-10-enyl-2-bromo-2-methylpropanoate, under thermal conditions to form a polymer substrate;
2) contacting oligo(ethylene glycol) methacrylate with said polymer substrate under first polymerizing conditions to provide a first polymer layer bound to the polymer substrate through the undec-10-enyl-2-bromo-2-methylpropanoate;
3) contacting 2-bromoisobutyryl bromide with said first polymer layer under reaction conditions to provide a reactive surface; and
4) contacting 1H,1H,2H,2H-perfluorodecyl methacrylate with said reactive surface under second polymerizing conditions to provide the hydrophobic coating.

It is contemplated that the superhydrophobic coating disclosed herein may be produced using more than two iterations of the SIP strategy to achieve a suitable surface topography. In addition, depending on the monomers used, it is possible that the second polymer layer be in direct contact with the first polymer layer thus omitting the second linker.

In some embodiments, the superhydrophobic surface is used to produce a microfluidic device, comprising at least one channel disposed thereon. Microfluidic devices comprising the hydrophobic surface disclosed herein are useful in the area of biotechnology, e.g., "lab-on-a-chip". Since microfluidic technology is based on the manipulation of liquid flow through microfabricated channels, the ability to control the liquid flow is desired. In addition, the in situ modification of an internal wall of a microfluidic channel made from iPDMS can be performed and used as microfluidic devices.

In some embodiments, the hydrophobic coating disclosed herein is protein resistant (Gudipati, C. S., et al., *Langmuir* 2005, 21, 3044-3053). Thus, in some embodiments, the hydrophobic coating is used to provide articles which are protein resistant. This enables the production of various protein resistant articles, such as microfluidic devices, which can be used for analytical and/or purification assays, and the like.

In addition, many objects such as boats and marine monitoring devices, which are continually exposed to water require a protective coating to preserve their utility. Therefore, these methods can also be applied to provide marine anti-fouling materials (Genzer, J., et al., *Biofouling* 2006, 22, 339-360). In some embodiments, the hydrophobic coating is used to produce articles which are marine antifoulable.

DETAILED DESCRIPTION

Abbreviations and Definitions

Figure 1:
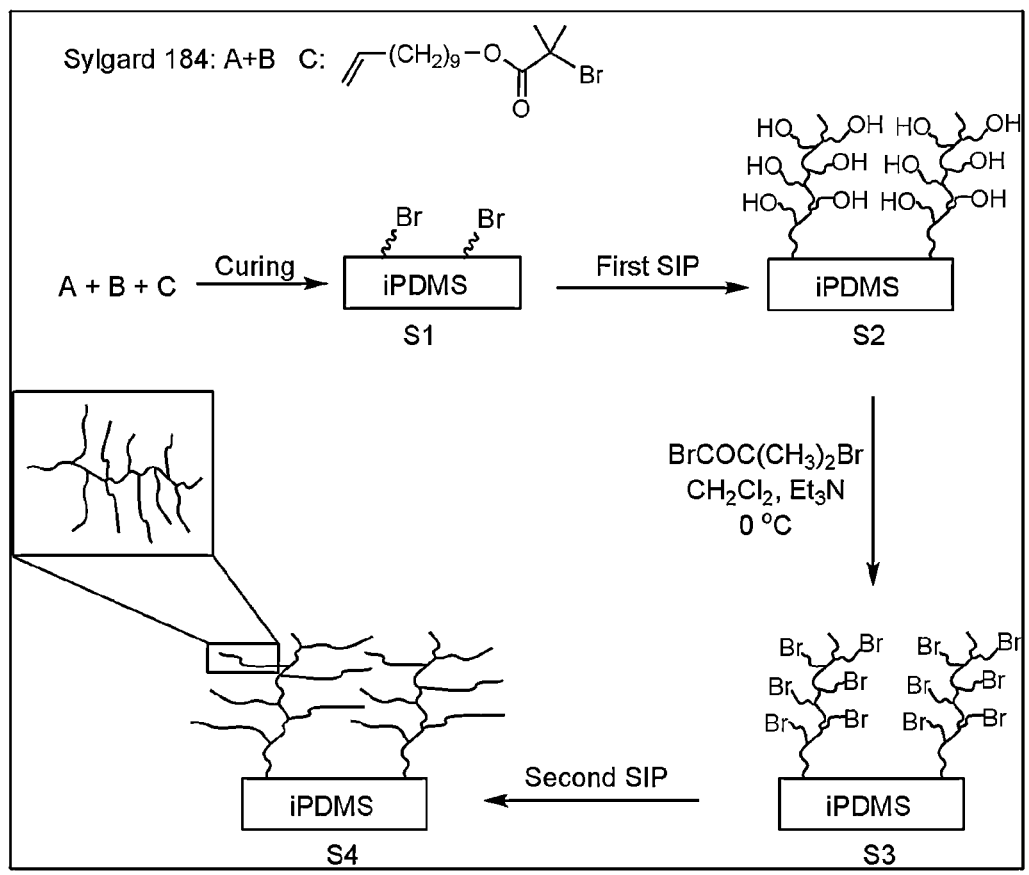
FIG. 1 shows the relayed surface-initiated polymerization (relayed SIP) from the initiator integrated PDMS (iPDMS) of ultra low initiator density (S1 stands for step 1). The inset shows a schematic of the microstructure of the polymer achieved by the second SIP.

Unless otherwise stated all temperatures are in degrees Celsius (° C.). Also, in these examples and elsewhere, abbreviations have the following meanings:

TABLE 1

| Abbreviation | Term |
| --- | --- |
| A | Amphere |
| AscA | Ascorbic Acid |

TABLE 1-continued

| Abbreviation | Term |
| --- | --- |
| BE | Binding Energy |
| Bipy | 2,2'-Bipyridine |
| DMF | Dimethylformamide |
| Et3N | tTriethylamine |
| eV | Electron Volts |
| FMA | 1H,1H,2H,2H-Perfluorodecyl methacrylate |
| h | Hour |
| HEMA | Hydroxyethyl methacrylate |
| kV | Kilovolt |
| M | Molar |
| mA | Milliamphere |
| Mg | Milligram |
| Min | Minutes |
| mL | Milliliter |
| mM | Millimolar |
| mm | Millimeter |
| MMA | Methyl Methacrylate |
| mmol | Millimole |
| ms | Millisecond |
| nm | Nanometer |
| μm | Micrometer |
| OEGMA | Oligo(ethylene glycol) methyl methacrylate |
| Pa | Pascal |
| PDMS | Poly(dimethyl siloxane) |
| iPDMS | Initiator Integrated PDMS |
| PMDETA | Pentamethyldiethylenetriamine |
| s | Second |
| SE | Standard Error |
| SIP | Surface-Induced Polymerization |
| V | Volt |
| XPS | X-ray Photoelectron Spectroscopy |

As used herein, certain terms may have the following defined meanings.

As used herein, the term "comprising" means that the compositions and methods include the recited elements, but do not exclude others. "Consisting essentially of" when used to define compositions and methods, shall mean excluding other elements of any essential significance to the combination when used for the intended purpose. Thus, a composition consisting essentially of the elements as defined herein would not exclude trace contaminants or inert carriers. "Consisting of" shall mean excluding more than trace elements of other ingredients and substantial method steps for preparing the microfluidic device. Embodiments defined by each of these transition terms are within the scope of the present technology.

The term "hydrophobic surface" refers to a surface that is difficult to wet. The term "superhydrophobic" surface refers to a hydrophobic surface which has a contact angle of at least about 150 degrees. In some embodiments, the hydrophobic surface has a contact angle of at least about 155 degrees, or alternatively, at least about 160 degrees, or alternatively, at least about 165 degrees, or alternatively, at least about 170 degrees, or alternatively, at least about 175 degrees, or alternatively, about 180 degrees. The term "contact angle" refers to the angle at which a liquid interface meets a solid surface. On many hydrophilic surfaces, water droplets will exhibit contact angles of 0 degrees to 30 degrees. If the solid surface is hydrophobic, the contact angle will be larger than 90 degrees. On superhydrophobic surfaces the surfaces have water contact angles as high as 150 degrees or even nearly 180 degrees. On these surfaces, water droplets simply rest on the surface, without actually wetting to any significant extent. These surfaces are termed superhydrophobic.

The term "polymer substrate" refers to a solid polymer comprising at least one base monomer and a linker to enable functionalization of the polymer substrate surface. The size of the polymer substrate is easily determined by one of skill in the art. It is contemplated that the size of the polymer substrate is not limited by any of the physical characteristics of the polymer. In addition, the shape of the polymer substrate can be dictated by the use of a mold. Such molds are well known to those of skill in the art. In some instances, at least two base monomers are used to make the polymer substrate. In some cases, base monomers comprise a polydimethylsiloxane having at least one vinyl group and a silicon hydride containing monomer, such that the silicon hydride containing monomer forms more than one covalent bond with at least one vinyl group on the polydimethylsiloxane and the resulting polymer substrate has a density of about $1 \text{ g mL}^{-1}$ and a contact angle of about 100 degrees to about 115 degrees. In some embodiments, the polydimethylsiloxane comprises a sufficient number of vinyl groups such that the physical properties of the resulting polymer substrate can be used to make the superhydrophobic surface. In addition, the silicon hydride containing monomer comprises a sufficient number of Si—H groups such that the physical properties of the resulting polymer substrate can be used to make the superhydrophobic surface. The base monomer mixtures may comprise additional components, such as other monomers or a catalyst, such as platinum. Various monomer mixtures are commercially available and include, for example, Sylgard® 184 (Dow Corning Corporation, Midland, Mich., United States), RTV 615 (Sil-Mid limited, Coleshill, West Midlands, United Kingdom) and ELASTOSiL® RT 601 (Wacker Chemie AG, San Jose, Calif., United States).

The polymer substrate further comprises a linker to enable functionalization of the polymer substrate surface wherein the first linker is incorporated into the polymer substrate at a substantially low concentration. In some embodiments, the linker is incorporated therein at a sufficient concentration to provide a surface density of about $3 \times 10^{-4}$ to about $9 \times 10^{-8}$. In some embodiments, the linker is incorporated therein at a sufficient concentration to provide a surface density of about $1 \times 10^{-5}$. In some embodiments, the volume to volume base monomer to linker ratio is about $11:10^{-3}$.

The term "linker" refers to a chain of atoms having from 1 to 40 atoms. Each linker may be linear, branched or cyclic and may be homogenous or heterogeneous in its atom content (e.g., linkers containing only carbon atoms or linkers containing carbon atoms as well as one or more heteroatoms present on the linker in the form of a hydroxyl, ketone, aldehyde, carboxyl, amine, amide, carbamate, urea, thiol, ether, etc., or residues thereof). In some embodiments, the linker contains 1 to 25 carbon atoms and 0 to 15 heteroatoms.

The term "bonded" refers to a chemical bond. Various types of chemical bonds can be employed in the methods disclosed herein, either alone or in combination. Examples of bonds include a covalent bond, a polar covalent bond, an ionic bond and a hydrogen bond.

The term "monomer" has the meaning understood by those skilled in the chemical art. That is, a monomer is a chemical compound that is capable of forming a macromolecule of repeating units of itself, i.e., a polymer. The term "monomer" is also intended to include "oligomers" which consists of more than one monomer unit. In some embodiments, the monomer is a hydrophobic monomer.

The terms "hydrophobic monomer" and "substantially hydrophobic monomer" refer to a monomer that, once polymerized, is sufficiently hydrophobic to form the superhydrophobic coating disclosed herein. In some embodiments, the hydrophobic monomer comprises fluorine. In some embodiments, the hydrophobic monomer comprises at least 10 fluorine atoms. Examples of hydrophobic monomers that can be used in the methods disclosed herein, are 1H,1H,2H,2H-perfluorodecyl methacrylate, 2,2,3,3,4,4,5,5,6,6,7,7-dodecafluoroheptyl acrylate, 4,4,5,5,6,6,7,7,8,9,9,9-dodecafluoro-2-hydroxy-8-(trifluoromethyl)nonyl methacrylate, 3,3,4,4,5,5,6,6,7,8,8,8-dodecafluoro-7-(trifluoromethyl)octyl acrylate, 3,3,4,4,5,5,6,6,7,7,8,8,9,9,10,10,11,12,12,12-eicosafluoro-11-(trifluoromethyl)dodecyl methacrylate, 3,3,4,4,5,5,6,6,7,7,8,8,9,9,10,10,11,11,12,12,12-heneicosafluorododecyl acrylate, 3,3,4,4,5,5,6,6,7,7,8,8,9,9,10,10,11,11,12,12,12-heneicosafluorododecyl methacrylate, 3,3,4,4,5,5,6,6,7,7,8,8,9,9,10,10,10-heptadecafluorodecyl methacrylate, 4,4,5,5,6,6,7,7,8,8,9,9,10,10,11,11,11-heptadecafluoro-2-hydroxyundecyl acrylate, 2,2,3,3,4,4,4-heptafluorobutyl acrylate, 3,3,4,4,5,5,6,6,7,7,8,8,9,10,10-hexadecafluoro-9-(trifluoromethyl)decyl acrylate, 3,3,4,4,5,5,6,6,7,7,8,8,9,10,10-hexadecafluoro-9-(trifluoromethyl)decyl methacrylate, 2,2,3,4,4,4-hexafluorobutyl acrylate, 1,1,1,3,3,3-hexafluoroisopropyl acrylate, 4,4,5,5,6,7,7,7-octafluoro-2-hydroxy-6-(trifluoromethyl)heptyl acrylate, 4,4,5,5,6,7,7,7-octafluoro-2-hydroxy-6-(trifluoromethyl)heptyl methacrylate, 2,2,3,3,4,4,5,5-octafluoropentyl acrylate, 2,2,3,3,4,4,5,5-octafluoropentyl methacrylate, 3,3,4,4,5,6,6,6-octafluoro-5-(trifluoromethyl)hexyl methacrylate, 2,2,3,3,3-pentafluoropropyl acrylate, 4,4,5,5,6,6,7,7,8,8,9,9,9-tridecafluoro-2-hydroxynonyl acrylate, 3,3,4,4,5,5,6,6,7,7,8,8,8-tridecafluorooctyl acrylate, 2,2,2-trifluoroethyl acrylate, Zonyl® TM fluoromonomer (Sigma Aldrich), [2,2,3,3,4,5,5,5-octafluoro-4-(trifluoromethyl)pentyl]oxirane, (2,2,3,3,4,4,5,5,5-nonafluoropentyl)oxirane, [2,2,3,3,4,4,5,5,6,6,7,7,8,9,9,9-hexadecafluoro-8-(trifluoromethyl)nonyl]oxirane, (2,2,3,3,4,4,5,5,6,6,7,7,8,8,9,9,9-heptadecafluorononyl)oxirane, glycidyl 2,2,3,3,4,4,5,5-octafluoropentyl ether, glycidyl 2,2,3,3,4,4,5,5,6,6,7,7-dodecafluoroheptyl ether, and the like. In one embodiment, the hydrophobic monomer is 1H,1H,2H,2H-perfluorodecyl methacrylate.

The term "polymer layer" refers to a polymer that is in contact with and layered on the surface of a polymer substrate. The SIP strategy disclosed herein yields a superhydrophobic coating having more than one polymer in contact with the surface of the polymer substrate. Herein, a first polymer layer is in contact with a first linker and a second polymer layer in contact with a second linker. It is contemplated that the height of the polymer layers can vary, provided that the combined height of all layers deposited in the SIP strategy result in a total height of greater than about 1000 nm and a width of greater than about 200 nm.

The term "polyether" refers to compounds which contain more than one ether group. Various polyethers can be utilized in the disclosed methods, such as for example polyethylene glycol and polypropylene glycol. In some embodiments, the polyether also comprises a polymerizable group. Various polymerizable groups can be used in the methods disclosed herein, such as an acrylate, methacrylate, vinyl ketone, methylvinyl ketone, acrylamide and methacrylamide. In some embodiments, the polyether has a molecular weight of about 100 to about 1000 g/mol. Alternatively, the polyether has a molecular weight of about 200 to about 900 g/mol, or alternatively, about 300 to about 800 g/mol, or alternatively, about 400 to about 700 g/mol, or alternatively, about 500 to about 600 g/mol. The polyethers can also be branched or linear. In some embodiments, the monomer is oligo(ethylene glycol) methacrylate.

The term "prepolymer" refers to a reactive low-molecular-weight macromolecule or an oligomer, capable of further polymerization. Examples of prepolymers include, but are not limited to, e.g., poly(dimethyl-methylvinylsiloxane) prepolymer and poly(dimethyl-methylhydrogensiloxane) precursors. The term "poly(dimethylmethylhydrogensiloxane) precursors" refers to a reactive low-molecular-weight macromolecule or an oligomer of dimethylmethylhydrogensiloxane, capable of further polymerization. Polymerization of these prepolymers or monomers can be accomplished by, as an example, free radical polymerization, metal catalyzed polymerization, heat, or combination thereof. In some embodiments, polymerization is accomplished using both metal catalyzed polymerization and heat.

The term "reaction conditions" refers to conditions which comprise solvent (if required), time, temperature, pressure, concentration, and the like. It is well known to those skilled in the art that the reaction conditions may vary depending on the components which are being reacted.

The term "substantially low concentration" refers to the concentration of linker required to yield a superhydrophobic surface. Although it is difficult to discern the exact density of the first linker on the initiator integrated PDMS (iPDMS) surface, one could reasonably assume that the amount of initiator integrated into the network of iPDMS is proportional to the feed ratio of the starting components. The feed ratio of the starting components can vary depending on the composition of the base monomers used. In some embodiments, the first linker is incorporated into the polymer substrate at a volume to volume ratio of about $11:10^{-3}$. In embodiments wherein more than one base monomer is used, the ratio of first and second base monomer to first initiator is about $10:1:10^{-3}$. In some embodiments, the polymer substrate has a first linker incorporated therein at a concentration to provide a surface density of from about $3\times10^{-4}$ to about $9\times10^{-8}$ units per $nm^2$. Alternatively, the polymer substrate has a first linker incorporated therein at a concentration to provide a surface density of from about $4\times10^{-4}$ to about $5\times10^{-7}$ units per $nm^2$, or alternatively, from about $5\times10^{-4}$ to about $1\times10^{-7}$, or alternatively, from about $6\times10^{-4}$ to about $5\times10^{-6}$, or alternatively, from about $7\times10^{-4}$ to about $1\times10^{-6}$, or alternatively, from about $8\times10^{-4}$ to about $5\times10^{-5}$ or alternatively, from about $9\times10^{-4}$ to about $2\times10^{-5}$ units per $nm^2$, or alternatively, about $1.0\times10^{-5}$ units per $nm^2$.

The term "alkyl" refers to saturated monovalent hydrocarbyl groups having from 1 to 25 carbon atoms, more particularly from 6 to 12 carbon atoms. The alkyl group can be branched or linear. This term is exemplified by groups such as methyl, ethyl, n-propyl, iso-propyl, n-butyl, t-butyl, n-pentyl, n-hexyl, n-heptyl, n-octyl, n-nonyl, n-decyl, n-dodecyl, and the like.

The term "functional group" refers to atoms or small groups of atoms (e.g., two to five) that exhibit a characteristic reactivity when treated with certain reagents. This term is exemplified by groups such as alkyl halides, a terminal alkene or alkyne, alcohols, thiols, sulfides, amines, and carbonyl derivatives, such as aldehydes, ketones, esters and alpha-haloesters.

The term "alkyl halide" refers to a chemical compound, consisting of an alkyl group as defined herein, wherein a hydrogen is replaced by at least one halogen atom.

The term "halide", "halo" or "halogen" refers to fluorine, chlorine, bromine and iodine.

The term "terminal alkene" refers to a functional group of the formula $-CH=CH_2$, which is bound to a carbon atom of an alkyl group.

The term "terminal alkyne" refers to refers to a functional group of the formula $-C\equiv CH$, which is bound to a carbon atom of an alkyl group.

The term "hydroxyl" refers to —OH. The term "alcohol" refers to a hydroxyl moiety which is bound to a carbon atom.

The term "thiol" refers to —SH.
The term "sulfide" refers to —S—S—.
The term "amine" refers to —$NH_2$.
The term "carbonyl derivatives" refers to functional groups composed of a carbon atom double-bonded to an oxygen atom: C=O. Examples of carbonyl derivatives include, but are not limited to, aldehydes, ketones, carboxylic acids, esters, amides, acyl halides, acid anhydrides, ureas, carbamates, and the like.

The term "aldehyde" refers to a functional group composed of a carbon atom bonded to a hydrogen atom and double-bonded to an oxygen atom yielding a terminal carbonyl group: —CH=O.

The term "ketone" refers to a functional group characterized by a carbonyl group (O=C<) bonded to two other carbon atoms.

The term "ester" refers to a functional group composed of a carbon atom bonded to an oxygen atom, a carbon atom and double-bonded to an oxygen atom. Esters, as used herein can have the chemical formula —(C=O)—O— or —O—(C=O)—.

The term "carboxyl" refers to —COOH.
The term "amide" refers to —NR—(C=O)—, where R can be hydrogen or alkyl.

The term "carbamate" refers to the functional group —NR(CO)O—, where R can be hydrogen or alkyl.

The term "urea" refers to a functional group —NR(CO)NR—, where R can be hydrogen or alkyl.

The term "ether" refers to a functional group having an oxygen atom bonded to two carbon atoms (—C—O—C—).

The term "alpha-haloester" refers to a functional group comprising an ester and an alkyl halide, wherein the alkyl halide is bonded to the carbonyl carbon of the ester moiety. In some embodiments, an alpha-haloester as disclosed herein is of the formula X—$CR_2$—CO—O— or —O—(C=O)—$CR_2$—X, wherein each R is independently hydrogen or alkyl, and X is a halogen. In some embodiments, the halogen is bromine.

The term "acrylate" refers to $CH_2$=CHCOO—.
The term "methacrylate" refers to $CH_2$=C($CH_3$)COO—.
The term "vinyl ketone" refers to $CH_2$=CHCO—.
The term "methylvinyl ketone" refers to $CH_2$=C($CH_3$)CO—.
The term "acrylamide" refers to $CH_2$=CHCONR—, where R is hydrogen or alkyl.

The term "methacrylamide" refers to $CH_2$=C($CH_3$)CONR—, where R is hydrogen or alkyl.

The term "acyl halide" refers to a functional group comprising a carbonyl group singly bonded to a halogen atom. Examples of acyl halides include —(C=O)Cl and —(C=O)Br.

The term "protein resistant" refers to a surface that does not significantly contact a protein. In addition, for many assay applications, it would be desirable that the surface does not impede the movement of proteins. Many coatings are not amenable for use with proteins as they are known to stick to or be attracted to many of the known surface coatings. For many applications, such as assays, lab-on-chips, and the like, it is desirable that the surface be sufficiently protein resistant as not to adversely effect the experiment outcome.

Hydrophobic Coatings

Superhydrophobic PDMS surfaces have attracted much research effort and have been produced by methods such as replicating from an artificial (He, B., et al., *Langmuir* 2003, 19, 4999-5003) or a natural mold (i.e., the lotus leaf, Sun, M. H., et al., *Langmuir* 2005, 21, 8978-8981), laser etching (Jin, M. H., et al., *Macromol. Rapid Commun.* 2005, 26, 1805-

1809), and mechanical assisted self-assembled monolayer (Genzer, J., et al., *Science* 2000, 290, 2130-2133). However, these methods cannot be applied to modifying the wall of pre-formed microfluidic channels. Furthermore, known methods for the functionalization of PDMS relies on the ability to first fabricate a functionalized PDMS.

Surface-initiated polymerization (SIP) has been conducted on substrates of high initiator concentration for the purpose of generating polymer brushes of extremely high density. Although the high density of polymer chains led to many unique properties (Tsujii, Y.; Ohno, K.; Yamamoto, S.; Goto, A.; Fukuda, T., Structure and properties of high density polymer brushes prepared by surface-initiated living radical polymerization. In *Surface-Initiated Polymerization I*, 2006; Vol. 197, pp 1-45), the increase of polymer chain density did not lead to superhydrophobicity. SIP, however, is advantageous not only for its ability to create high density polymer brushes but also for that SIP provided better structural control of the resulting coatings.

The superhydrophobic coatings disclosed herein are the result of a relayed SIP strategy which includes the deposition of more than one polymer layer onto the surface of a polymer substrate. In addition, three factors are optimized in the coating described herein to achieve the superhydrophobic surfaces. These factors include: 1) an ultra low initiator density, 2) the relayed SIP strategy, and 3) a hydrophobic monomer.

Disclosed herein is a hydrophobic coating having a contact angle of at least about 150 degrees, which coating comprises:
 a polymer substrate comprising a first linker incorporated therein at a specified surface density of from about $3 \times 10^{-4}$ to about $9 \times 10^{-8}$ units per $nm^2$;
 a first polymer layer in contact with said first linker;
 a second linker in contact with said first polymer layer; and
 a second polymer layer in contact with said second linker.

The polymer substrate is a solid polymer comprising at least one base monomer and a linker to enable functionalization of the polymer substrate surface. The size of the polymer substrate is easily determined by one of skill in the art. It is contemplated that the size of the polymer substrate is not limited by any of the physical characteristics of the polymer. In addition, the shape of the polymer substrate can be dictated by the use of a mold. Such molds are well known to those of skill in the art. In some embodiments, the polymer substrate comprises poly(dimethyl) siloxane (PDMS). In some instances, at least two base monomers are used to make the polymer substrate. Various monomer mixtures can be used in addition with the first linker to form the polymer substrate. Examples of these include, but are not limited to, Sylgard® 184 (Dow Corning Corporation Midland, United States), RTV 615 (Sil-Mid limited, Coleshill, West Midlands, United Kingdom), and ELASTOSiL® RT 601 (Wacker Chemie AG, San Jose, Calif., United States).

The polymer substrate further comprises a linker to enable functionalization of the polymer substrate surface, wherein the first linker is incorporated therein at a specified surface density of from about $3 \times 10^{-4}$ to about $9 \times 10^{-8}$ units per $nm^2$. In some embodiments, the first linker is incorporated at a surface density of about $1.0 \times 10^{-5}$ units per $nm^2$. The surface density of the first linker is calculated based on the assumption that the first linker is evenly distributed throughout the PDMS network. In some embodiments, the first linker is incorporated into the polymer substrate at a volume to volume ratio of about $11:10^{-3}$. In embodiments wherein more than one base monomer is used, the ratio of first and second base monomer to the first initiator is about $10:1:10^{-3}$. In some embodiments, the first linker comprises an alkyl group with a terminal functional group. In some embodiments, the first linker comprises a linear ($C_6$-$C_{12}$) alkyl group with a terminal alpha-haloester group.

Figure 2:
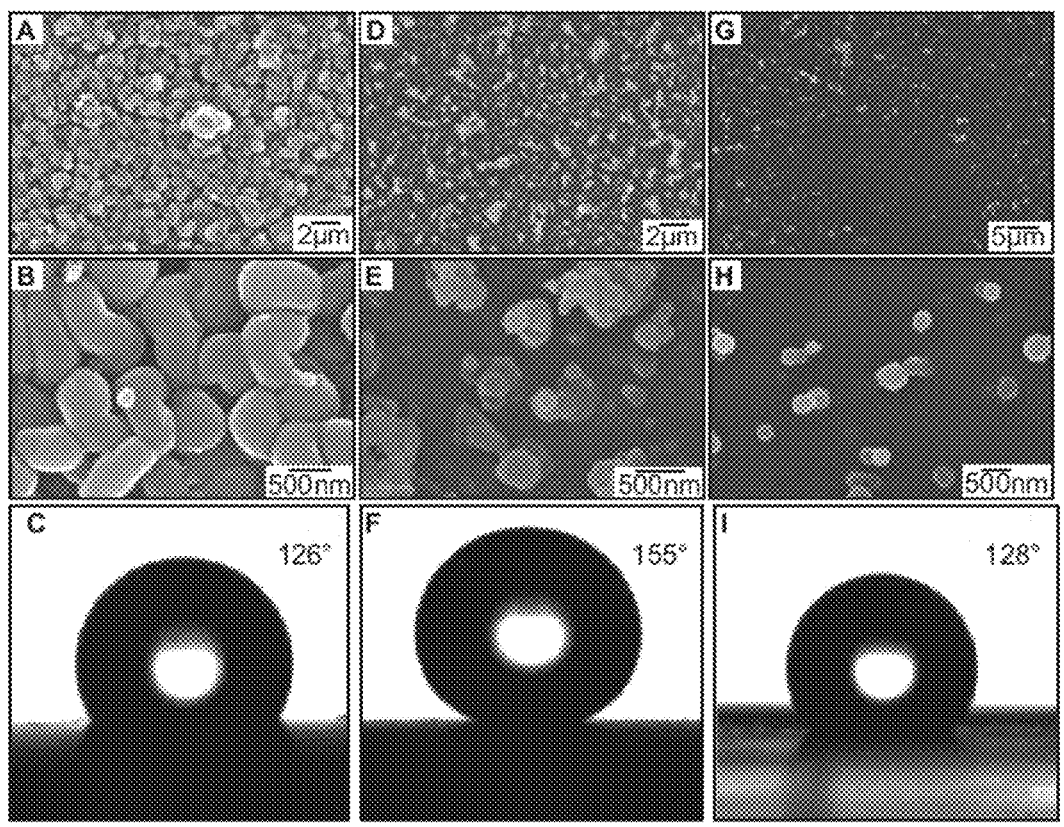
FIG. 2, panels (A)-(I), show scanning electron microscope and contact angle images of the initiator integrated PDMS (iPDMS) surfaces after the relayed surface-initiated polymerization (SIP) strategy (A)-(F) and after only one iteration of the SIP strategy (G)-(I). Panels (A) and (B) show the surface morphology of the iPDMS with a feed initiator ratio of 0.5 (0.5iPDMS). Panel (C) shows a water droplet on the 0.5iPDMS surface. Panels (D) and (E) show the surface morphology of the iPDMS with a first linker ratio of $10:1:10^{-3}$ ($10^{-3}$iPDMS). Panel (F) shows a water droplet on the $10^{-3}$iPDMS surface. The sliding angle was determined to be about 1.5 degrees. Panels (G) and (H) show the surface morphology of the 0.5iPDMS after only one iteration of the SIP strategy using 1H,1H,2H,2H-perfluorodecyl methacrylate (FMA). Panel (I) shows a water droplet on the 0.5iPDMS surface after only one iteration of the SIP strategy using FMA.

The SIP strategy disclosed herein yields a superhydrophobic coating having more than one polymer in contact with the surface of the polymer substrate. Herein, the first polymer layer is in contact with the first linker. In some embodiments, the first polymer layer is bonded to the first linker. In some embodiments, the first polymer layer is bonded to the first linker by a carbon-carbon bond. The height of each of the polymer layers is largely dependent on the polymerization reaction time. It is contemplated that the height of the polymer layers can vary, provided that the combined height of all layers deposited in the SIP strategy result in a total height of greater than about 1000 nm and a width of the polymer nodes of greater than about 200 nm. In some embodiments, the height of the first polymer layer is about 2 μm to 5 μm. In some embodiments, the height of the first polymer layer is about 3 μm. It is further contemplated that the width of the first polymer layer should be between about 100 nm to about 500 nm (see FIG. 2, panels (G) and (I)). Alternatively, the width can be from about 200 nm to about 400 nm, or alternatively, about 200 nm to about 300 nm. In some embodiments, the width of the polymer layer is about 300 nm.

In some embodiments, the first polymer layer comprises a polyether. Various polyethers can be utilized in the disclosed methods, such as for example polyethylene glycol and polypropylene glycol. In some embodiments, the polyether also comprises a polymerizable group. Various polymerizable groups can be used in the methods disclosed herein, such as an acrylate, methacrylate, vinyl ketone, methylvinyl ketone, acrylamide and methacrylamide. In some embodiments, the polyether has a molecular weight of about 100 to about 1000 g/mol. Alternatively, the polyether has a molecular weight of about 200 to about 900 g/mol, or alternatively, about 300 to about 800 g/mol, or alternatively, about 400 to about 700 g/mol, or alternatively, about 500 to about 600 g/mol. The polyethers can also be branched or linear. In some embodiments, the first polymer layer comprises polyethylene glycol. In some embodiments, the monomer is oligo(ethylene glycol) methacrylate.

The superhydrophobic coating disclosed herein comprises a second polymer layer in contact with the first polymer layer. In some embodiments, the first and second polymer layers contact each other via a second linker which is in contact with the first and second polymer layers. In some embodiments, the second linker is bonded to the first polymer layer. In some embodiments, the bond is an ester bond. In some embodiments, the second linker comprises a carbonyl group.

In some embodiments, the second linker is bonded to the first and second polymer layer. In some embodiments, the bond is a carbon-carbon bond.

As stated herein, one factor required to achieve the superhydrophobic surfaces is a substantially hydrophobic monomer. Thus, the outermost polymer layer on the superhydrophobic surface comprises a substantially hydrophobic monomer. In some embodiments, the second polymer layer is the outermost layer on an article. The height second polymer layer of each of the polymer layers is largely dependent on the polymerization reaction time. It is contemplated that the height of the polymer layers can vary, provided that the combined height of all layers deposited in the SIP strategy result in a total height of greater than about 1000 nm and a width of greater than about 200 nm. In some embodiments, the second polymer layer comprises fluorine.

Also disclosed herein is a hydrophobic coating having a contact angle of at least about 150°, which coating comprises:

a poly(dimethyl) siloxane substrate comprising a first linker incorporated therein at a surface density of from about $3 \times 10^{-4}$ to about $9 \times 10^{-8}$ units per $nm^2$;

a polyether layer in contact with said first linker;

a second linker in contact with to said polyether layer; and a fluorinated polymer layer in contact with said second linker.

Methods for Making a Hydrophobic Coating Using a Relayed Surface-Initiated Polymerization (SIP) Strategy The relayed surface-initiated polymerization (SIP) strategy involves three factors which are optimized in the coating described herein to achieve the superhydrophobic surfaces. These factors include: 1) an ultra low initiator density, 2) the relayed SIP strategy, and 3) a hydrophobic monomer.

Disclosed herein is a method of making a hydrophobic coating having a contact angle of at least about 150 degrees, said method comprising:

1) providing a polymer substrate wherein a first linker is incorporated into the substrate at a surface density of from about $3 \times 10^{-4}$ to about $9 \times 10^{-8}$ units per $nm^2$;

2) contacting a monomer with said first linker under first polymerizing conditions to provide a first polymer layer bound to the polymer substrate through the first linker;

3) contacting a second linker with said first polymer layer under reaction conditions to provide a reactive surface; and 4) contacting a monomer with said reactive surface under second polymerizing conditions to provide the hydrophobic coating.

The relayed surface-initiated polymerization (SIP) strategy begins by providing a polymer substrate wherein a first linker is incorporated into the substrate at a surface density of from about $3 \times 10^{-4}$ to about $9 \times 10^{-8}$ units per $nm^2$. The polymer substrate is provided by polymerizing a monomer mixture comprising at least one base monomer and a substantially low concentration of a first linker. In some embodiments, the method further comprises a second base monomer.

Various base monomers can be employed to make the polymer substrate. In some embodiments, at least two base monomers are used to make the polymer substrate. In some embodiments, base monomers comprise a polydimethylsiloxane having at least one vinyl group and a silicon hydride containing monomer, wherein the silicon hydride forms a covalent bond with the vinyl groups. In some cases, base monomers comprise a polydimethylsiloxane having at least one vinyl group and a silicon hydride containing monomer, such that the silicon hydride containing monomer forms more than one covalent bond with at least one vinyl group on the polydimethylsiloxane and the resulting polymer substrate has a density of about 1 g $mL^{-1}$ and a contact angle of about 100 degrees to about 115 degrees. In some embodiments, the at least one base monomer is a poly(dimethyl-methylvinylsiloxane) prepolymer. In some embodiments, the second base monomer comprises a poly(dimethyl-methylhydrogensiloxane) precursor.

The base monomer mixtures may comprise additional components, such as other monomers or a catalyst, such as platinum. Various monomer mixtures are commercially available and include, for example, Sylgard® 184 (Dow Corning Corporation Midland, Mich., United States), RTV 615 (Sil-Mid limited, Coleshill, West Midlands, United Kingdom), and ELASTOSiL® RT 601 (Wacker Chemie AG, San Jose, Calif., United States).

The polymer substrate further comprises a linker to enable functionalization of the polymer substrate surface. In some embodiments, the surface density of the linker is about $1.0 \times 10^{-5}$ units per $nm^2$. The surface density of the first linker is calculated based on the assumption that the first linker is evenly distributed throughout the PDMS network. In some embodiments, the polymer substrate has the first linker incorporated therein at a volume to volume ratio of about $11:10^{-3}$. Alternatively, in some embodiments, the first linker incorporated therein at a volume to volume ratio of from about $11:5 \times 10^{-2}$ to about $11:5 \times 10^{-5}$, or alternatively, from about $11:5 \times 10^{-2}$ to about $11:10^{-5}$, or alternatively, from about $11:5 \times 10^{-2}$ to about $11:5 \times 10^{-4}$, or alternatively, from about $11:5 \times 10^{-2}$ to about 11:10, or alternatively, from about $11:5 \times 10^{-2}$ to about $11:10^{-4}$. In embodiments wherein more than one base monomer is used. In some embodiments, the volume to volume ratio of first and second base monomer to first linker is about $10:1:10^{-3}$.

In some embodiments, the first linker comprises an alkyl group further comprising at least one terminal unreacted functional group. Various functional groups can be employed in the methods disclosed herein. Examples of functional groups include, but is not limited to, e.g., alkyl halides, a terminal alkene or alkyne, alcohols, thiols, sulfides, amines, and carbonyl derivatives, such as aldehydes, ketones and esters. In some embodiments, the at least one terminal unreacted functional group is an alpha-haloester. In some embodiments, the first linker is undec-10-enyl-2-bromo-2-methylpropanoate which has the structure shown below.

Formula I

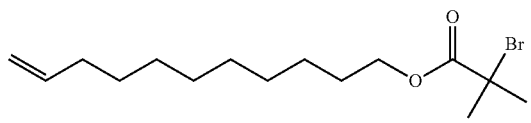

The polymerization of the at least one base monomer and first linker provides the polymer substrate. In some cases the polymer substrate is cured at about 80° C. for about 2 hours. Higher temperatures such as this can be used to decrease the polymerization or curing time although the polymer substrate can be polymerized at room temperature (about 25° C.) for about one day. As would be obvious to one of skill in the art, the exact polymerization conditions used can vary greatly based on the requirements for a given monomer mixture.

After polymerization of the polymer substrate, a first polymer layer is deposited onto the surface. This is referred to as the first SIP and can be accomplished by contacting a monomer with the first linker under first polymerizing conditions to provide a first polymer layer bound to the polymer substrate through the first linker. In some embodiments, the reaction conditions comprise first forming a monomer mixture comprising a catalyst prior to contacting the polymer substrate. In some embodiments, the first polymerizing conditions comprise heating the monomer and linker to a temperature of from about 30° C. to about 90° C. Alternatively, in some embodiments, the first polymerizing conditions comprise allowing the monomer react with the polymer substrate for about 2 hours at room temperature (about 25° C.). In some embodiments, the first polymerizing conditions comprise a deoxygenating step.

The height of each of the polymer layers is largely dependent on the polymerization reaction time. It is contemplated that the height of the polymer layers can vary, provided that the combined height of all layers deposited in the SIP strategy result in a total height of greater than about 1000 nm and a width of greater than about 200 nm. In some embodiments, the height of the first polymer layer is about 2 μm to 5 μm. In some embodiments, the height of the first polymer layer is about 3 μm. It is further contemplated that the width of the first polymer layer should be between about 100 nm to about 500 nm (see FIG. 2, panels (G) and (I)). Alternatively, the width can be from about 200 nm to about 400 nm, or alternatively, about 200 nm to 300 nm. In some embodiments, the width of the polymer layer is about 300 nm.

In some embodiments, the monomer comprises at least one functional group selected from the group consisting of an alkyl halide, a terminal alkene or alkyne, hydroxyl, thiol, sulfide, amine, and carbonyl derivative, such as aldehyde, ketone, ester and alpha-haloester. In some embodiments, the monomer comprises at least one hydroxyl group. In some embodiments the monomer comprises a polyether. "Polyether" compounds contain more than one ether group. Various polyethers can be utilized in the disclosed methods, such as, for example, polyethylene glycol and polypropylene glycol. In some embodiments, the polyether also comprises a polymerizable group. Various polymerizable groups can be used in the methods disclosed herein, such as an acrylate, methacrylate, vinyl ketone, methylvinyl ketone, acrylamide and methacrylamide. The polyethers can also be branched or linear. In some embodiments, the monomer is oligo(ethylene glycol) methacrylate.

The next step of the SIP strategy involves contacting a second linker with said first polymer layer under reaction conditions to provide a reactive surface. A reactive surface is needed in order to successfully deposit the second polymer layer. This can be accomplished by the use of a second linker. In some embodiments, the second linker comprises at least two reactive functional groups. Various reactive functional groups can be employed, such as acyl halides, esters, alkyl halides, amides, and the like. In some embodiments, the second linker comprises an acyl halide. In some embodiments, the second linker is 2-bromoisobutyryl bromide.

In some embodiments, the reaction conditions comprise acetylation conditions which are well known in the art. In general, the reaction conditions depend on the functional groups of the second linker. These reaction conditions would be apparent to one of skill in the art. For example, when the second linker comprises an acyl halide, the reaction conditions comprise acetylation conditions. These acetylation conditions might comprise cooling the intermediate polymer substrate to about 0° C., followed by the addition of a base, such as a tertiary amine, and addition of the second linker dropwise. Other reactions conditions, such as the solvent and time may vary depending on the nature of the second linker. In some embodiments, the reaction time is about 30 to 45 minutes.

Once the reactive surface is formed, the second polymer layer can be deposited. This is referred to as the first SIP and can be accomplished by contacting a monomer with said reactive surface under second polymerizing conditions thus providing the hydrophobic coating. As discussed herein, one of the factors required to achieve the superhydrophobic surface is the incorporation of a substantially hydrophobic monomer as the outermost polymer layer. In some embodiments, the second polymer layer is the outermost layer. Various hydrophobic monomers can be used in the methods disclosed herein and are known to those of skill in the art. In some embodiments, the second polymer layer comprises fluorine. In some embodiments, the substantially hydrophobic monomer is 1H,1H,2H,2H-perfluorodecyl methacrylate.

In some embodiments, the second polymerizing conditions comprise heating the monomers to about 80° C. In some embodiments, the reaction conditions comprise first forming a monomer mixture comprising a catalyst prior to contacting the second linker. In some embodiments, the second polymerizing conditions comprise heating the monomer and linker to a temperature of from about 25° C. to about 90° C. Alternatively, in some embodiments, the second polymerizing conditions comprise allowing the monomer to react with the polymer substrate for about 2 hours at room temperature (about 25° C.). Again, the height of each of the polymer layers is largely dependent on the polymerization reaction time. It is contemplated that the height of the polymer layers can vary, provided that the combined height of all layers deposited in the SIP strategy result in a total height of greater than about 1000 nm and a width of greater than about 200 nm. In some embodiments, the second polymerizing conditions comprise a deoxygenating step.

Also disclosed herein is a method for making a hydrophobic coating having a contact angle of at least about 150 degrees, said method comprising:

1) polymerizing a mixture comprising a poly(dimethyl-methylvinylsiloxane) prepolymer, poly(dimethyl-methylhydrogensiloxane) precursors and undec-10-enyl-2-bromo-2-methylpropanoate, under thermal conditions to form a polymer substrate;
2) contacting oligo(ethylene glycol) methacrylate with said polymer substrate under first polymerizing conditions to provide a first polymer layer bound to the polymer substrate through the undec-10-enyl-2-bromo-2-methylpropanoate;
3) contacting 2-bromoisobutyryl bromide with said first polymer layer under reaction conditions to provide a reactive surface; and
4) contacting 1H,1H,2H,2H-perfluorodecyl methacrylate with said reactive surface under second polymerizing conditions to provide the hydrophobic coating.

In some embodiments, the polymerization conditions can result in various polymerization mechanisms. Various types of polymerizations can be used such as, for example, cationic, anionic, free radical and living polymerizations. Such polymerizations can be metal catalyzed polymerization reactions. In some embodiments, the polymerization conditions comprise a metal catalyst. Various metals can be used as a catalyst herein, such as, platinum, copper, iron, manganese, cobalt, molybdenum, tin, zinc, ruthenium, rhodium, and the like. In some embodiments, the metal comprises copper. In some embodiments, the first polymerizing conditions comprises metal catalyzed polymerization. In some embodiments, the second polymerizing conditions comprises metal catalyzed polymerization.

Uses for the Superhydrophobic Coating(s)

Disclosed herein is a simple surface initiated polymerization (SIP) method to render a surface superhydrophobic. Three factors are all required to achieve the superhydrophobic surfaces, namely, the ultra low initiator density, the relayed SIP strategy, and the hydrophobic monomer.

In some embodiments, the superhydrophobic surface is used to produce a microfluidic device, comprising at least one channel disposed thereon. Since microfluidic technology is based on the manipulation of liquid flow through microfabricated channels, the ability to control the liquid flow is desired. In some embodiments, the microfluidic device comprises the hydrophobic coating disclosed herein on at least a portion of the surface.

In addition, the in situ modification of an internal wall of a microfluidic channel made from iPDMS can be performed and used as microfluidic devices. In some embodiments, the hydrophobic coating disclosed herein is on at least a portion of the walls of the microfluidic channels.

Microfluidic devices comprising the hydrophobic surface disclosed herein would be useful in the area of biotechnology, e.g., the "lab-on-a-chip". Current "lab-on-a-chip" devices are non-ideal due to the fact that physical and chemical effects become more dominant on a small-scale, and effects such as capillary forces, surface roughness and chemical interactions of construction materials on reaction processes can be enhanced.

In some embodiments, the hydrophobic coating disclosed herein is protein resistant (Gudipati, C. S., et al., *Langmuir* 2005, 21, 3044-3053). Thus, in some embodiments, the hydrophobic coating is used to provide articles which are protein resistant. This enables the production of various protein resistant articles, such as microfluidic devices, which can be used for analytical and/or purification assays, and the like. The superhydrophobi coating disclosed herein inhibited protein (fluorescently labeled bovine serum albumin) adsorption and small molecule (Rhodamine B) absorption to the level undetectable by fluorescent microscope, which were long standing problems in microfluidics (Huang, B., et al., *Science* 2007, 315, 81-84, Roman, G. T., et al., *Anal. Chem.* 2005, 77, 1414-1422, Toepke, M. W., et al., *Lab Chip* 2006, 6, 1484-1486, Song, H., et al., *Anal. Chem.* 2006, 78, 4839-4849).

In addition to microfluidic devices and "lab-on-chips", the hydrophobic coating disclosed herein can be used anywhere that a hydrophobic coating is desired. For example, many objects, such as boats and marine monitoring devices, which are continually exposed to the ocean require a protective coating to preserve their utility. Therefore, these methods can also be applied to provide marine anti-fouling materials (Genzer, J., et al., *Biofouling* 2006, 22, 339-360). In some embodiments, the hydrophobic coating is used to produce articles which are marine antifoulable.

In some embodiments, the hydrophobic coating is used to produce articles which provides a surfaces for sliding behavior study for purposes of materials engineering (Granick, S., et al., *Nat. Mater.* 2003, 2, 221-227).

EXAMPLES

All numerical designations, e.g., pH, temperature, time, concentration, and molecular weight, including ranges, are approximations which are varied (+) or (−) by increments of 0.1. It is to be understood, although not always explicitly stated that all numerical designations are preceded by the term "about". It also is to be understood, although not always explicitly stated, that the reagents described herein are merely exemplary and that equivalents of such are known in the art.

These and other embodiments of the present technology will readily occur to those of ordinary skill in the art in view of the disclosure herein and are specifically contemplated.

The present technology is further understood by reference to the following examples, which are intended to be purely exemplary of the present technology. The present technology is not limited in scope by the exemplified embodiments, which are intended as illustrations of single aspects of the present technology only. Any methods that are functionally equivalent are within the scope of the present technology. Various modifications of the present technology in addition to those described herein will become apparent to those skilled in the art from the foregoing description and accompanying figures. Such modifications fall within the scope of the appended claims.

The vinyl terminated initiator (v-initiator, undec-10-enyl 2-bromo-2-methylpropanoate) was obtained from HZDW (99%, Hangzhou, China). Oligo(ethylene glycol) methyl methacrylate (OEGMA, 98%), 1H,1H,2H,2H-perfluorodecyl methacrylate (FMA, 99%), methyl methacrylate (MMA, 99%), hydroxyethyl methacrylate (HEMA, 97%), and 2-bromoisobutyryl bromide (98%) were purchased from Aldrich and used as received. A HITACH-54800 scanning electron microscope was used to characterize iPDMS surfaces. The microscope was operated at 10.0 kV. Prior to measurements, the samples were coated with a thin gold film by means of a vacuum sputter to improve electrical conductivity. Water contact angles were measured on a Dataphysics OCA20 contact angle system at room temperature. All data was collected and analyzed using software provided by the manufacturer.

Example 1

SIP from iPDMS

Sylgard 184 was used as a model PDMS elastomer, which was commercially available from Dow Corning and consisted of liquid components A (a mixture of catalyst Pt and prepolymer dimethylsiloxane with vinyl groups) and B (prepolymer dimethylsiloxane with vinyl groups and Si—H groups). PDMS and initiator integrated PDMS (iPDMS) substrates (flat surface and as the walls of microfluidic channels) were prepared by thoroughly mixing the three components A, B (from Sylgard 184) and C (initiator) at a desired volume/volume ratio (A:B:C=10:1:C, C varied from 0.5 to $10^{-6}$) and cured at 80° C. for 2 h.

For the SIP of OEGMA, the reaction mixture was prepared by thoroughly mixing two parts. Part 1 was a transparent, pale-blue solution, prepared by adding a specified amount of $CuCl_2$ (5.4 mg, 0.4 mmol), 2,2'-bipyridine (Bipy, 12.5 mg, 0.8 mmol, i.e., 1:2 mole ratio) and a fixed amount monomer to 5 mL Milli-Q water. Part 2 was a colorless solution, prepared by adding a specified amount of ascorbic acid (AscA, 7.0 mg, 0.4 mmol) to 5 mL Milli-Q water. Both solutions were deoxygenated and the two parts were mixed together under a nitrogen atmosphere. The mixture was further deoxygenated and the resulting mixture was red in color due to the reduction of deactivator Cu(II)/Bipy complex to activator Cu(I)/Bipy complex. The resulting mixture had a mole ratio of monomer/CuCl2/Bipy/AscA=200/1/2/1, with a feed $CuCl_2$ concentration of 0.04 mM. This mixture was then transferred to a reaction setup under nitrogen atmosphere and SIP was initiated and continued for 120 min at about 25° C. The polymerization was stopped when iPDMS was removed from the solution. Samples were thoroughly rinsed with methanol, Milli-Q water, and dried under flowing nitrogen before further treatment.

After the first SIP, the iPDMS was functionalized with bromoisobutyryl bromide as the initiation moiety. Samples were immersed in N,N-Dimethylformamide (DMF) (70 mL) at 0° C., and $Et_3N$ (1.16 mL, 7 mmol) was added dropwise, the concentration of $Et_3N$ in DMF was kept at 0.1 M. After the mixture was stirred for about 10 min, we then added dropwise $BrCOC(CH_3)_2Br$ (0.88 mL, 7 mmol) into the mixture and stirred for another 30 min. The samples were then thoroughly rinsed with DMF, followed by the second SIP of FMA and surface characterization.

For the second SIP, 1.06 g FMA (2 mmol) was added in 10 mL DMF by drops, and commixed by magnetic bar under deoxygenating protection for 20 minutes. Then CuBr (28 mg, 0.2 mmol) and pentamethyldiethylenetriamine (PMDETA, 52 mg, 0.3 mmol) were added to the solution and mixed well resulting in a homogeneous green solution. The resulting mixture had a mole ratio of monomer/CuBr/PMDETA=200/2/3. After deoxygenated for 30 minutes, this mixture was then transferred to a reaction setup under nitrogen atmosphere. SIP was initiated and continued for 120 min at about 25° C. Details of the SIP condition for monomer HEMA and MMA can be found in a previous report (He, J., et al., *Macromolecules* 2007, 40, 3090-3096). For in situ modification of intact microfluidic channels, reaction solutions were pumped through the channel for a desired period of time.

X-ray Photoelectron Spectroscopy (XPS) (AXIS Ultra by Kratos Analytical, UK) was used to characterize the surface chemistry of iPDMS before and after SIP modification. Monochromatic Al Ka X-rays (1486.7 eV) were employed. The X-ray source was 2 mm nominal X-ray spot size operating at 15 kV and 12 mA for both survey and high-resolution spectra. Neutralizer gun was on (1.85 A and 3.15 V). Survey spectra, from 0 to 1100 eV binding energy (BE), were recorded at 160 eV pass energy with an energy step of 1.0 eV, and a dwell time of 200 ms. High-resolution spectra were recorded at 40 eV pass energy with an energy step of 0.1 eV, and a dwell time of 500 ms, with a typical average of 3 scans. The operating pressure of the spectrometer was typically about $10^{-7}$ Pa. All peaks were referenced to C 1s ($CH_x$) at 285 eV in the survey scan spectra and C 1s ($CH_x$) at 284.8 eV in the deconvoluted high-resolution C 1 s spectra.

Example 2

Calculation of Surface Density of Initiator

The surface density of initiator was calculated based on the assumption that initiators were evenly distributed throughout the PDMS network. The density of PDMS is 1.03 g $mL^{-1}$. It was also assumed that iPDMS had the same density as of PDMS. For the case of 0.5iPDMS in this experiment, the volume was $(10+1+0.5)/1.03=11.17$ $cm^3$, the number of initiator molecules was $N_A \times 0.5/319 = 9.44 \times 10^{20}$, the density was $9.44 \times 10^{20}/11.17 = 8.4 \times 10^{-2}$ chain $nm^{-3}$. It was further assumed the initiator had a cubic crystal structure (a=2.3 nm) and the surface density was $8.4 \times 10^{-2}/2.3 = 3.7 \times 10^{-2}$ chain $nm^{-2}$. Table 2, below, shows the density and surface density of initiator for different iPDMS samples.

The first SIP from iPDMS surfaces of varied initiator density was conducted using monomer oligo(ethylene glycol) methacrylate (Mw=526, OEGMA). The resulting poly(OEGMA) chains had terminal hydroxyl groups for further functionalization. The iPDMS substrates were then treated with bromoisobutyryl bromide as the initiation moiety, followed by the second SIP using monomer 1H,1H,2H,2H-perfluorodecyl methacrylate (FMA). The resulting surface was covered with polymeric trees that had the poly(FMA) as the branches and the poly(OEGMA) as the central trunk. After each modification step, the surfaces were characterized by XPS, SEM and contact angle of pure water. This three dimensional growth of polymer is referred to as the relayed SIP method.

The impact of initiator density was first tested as follows: iPDMS with five mass ratios of A:B:C were investigated, namely, 10:1:0.5, $10:1:10^{-1}$, $10:1:10^{-2}$, $10:1:10^{-3}$ and $10:1:10^{-6}$. From this point on, these five types of iPDMS are referred to as 0.5iPDMS (corresponding to a surface density of $3.7 \times 10^{-2}$ chain $nm^{-2}$, see Example 2 for a detailed calculation), $10^{-1}$iPDMS, $10^{-2}$iPDMS, $10^{-3}$iPDMS (surface density of $1.0 \times 10^{-5}$ chain $nm^{-2}$) and $10^{-6}$iPDMS. For a given SIP duration of 2 hours for both the first and second SIP, only the $10^{-3}$iPDMS yielded superhydrophobic surface. Thus, only representative results from two iPDMS samples, namely 0.5iPDMS and $10^{-3}$iPDMS, with fixed SIP duration of 2 hours for both the first and second SIP are shown and discussed.

Prior to the first SIP processes, XPS detected 0.1 atom % Br signal on the surface of 0.5iPDMS samples, which was consistent with the initiators evenly distributed both on the iPDMS surface and within its body (Wu, Y. Z., et al., *J. Am. Chem. Soc.* 2007, 129, 7226-7227). However, XPS indicated no detectable Br signal for the $10^{-3}$iPDMS samples. This is can be attributed to the limited sensitivity of XPS as the $10^{-3}$iPDMS sample did initiate polymerization from its surface, which resulted in polymer that in turn acted as an amplification of the initiator and was detectable by XPS (see Table

TABLE 2

|  | 0.5iPDMS | $10^{-1}$iPDMS | $10^{-2}$iPDMS | $10^{-3}$iPDMS | $10^{-6}$iPDMS |
|---|---|---|---|---|---|
| Density (chain $nm^{-3}$) | $8.4 \times 10^{-2}$ | $1.8 \times 10^{-2}$ | $1.8 \times 10^{-3}$ | $1.8 \times 10^{-4}$ | $1.8 \times 10^{-7}$ |
| Surface Density (chain $nm^{-3}$) | $3.7 \times 10^{-2}$ | $4.7 \times 10^{-3}$ | $2.2 \times 10^{-4}$ | $1.0 \times 10^{-5}$ | $1.0 \times 10^{-9}$ |
| a (cubic crystal structure parameter, nm) | 2.3 | 3.8 | 8.3 | 17.8 | 178.2 |

Example 3

The Initiator Integrated PDMS (iPDMS): The Impact of Initiator Density

The initiator integrated PDMS (iPDMS) was prepared as described in Example 1. Briefly, a vinyl-terminated initiator (referred to as component C, FIG. 1) was mixed with Sylgard 184 (Dow Corning), which consisted of liquid components A and B (Wu, Y. Z., et al., *J. Am. Chem. Soc.* 2007, 129, 7226-7227). The mixture was then cured at 80° C. for 2 h, resulting in an elastomer. This simple mixing procedure was compatible with replica molding, which was the key step in the fabrication of microfluidic devices. The resulting iPDMS elastomer presented initiator molecules on the surface and was ready for further surface modification via SIP (FIG. 1).

3, $10^{-3}$iPDMS, S4). XPS signals of C, O, and Si for the $10^{-3}$iPDMS samples were reasonably close to those for the 0.5iPDMS (Table 3). Both the $10^{-3}$iPDMS and 0.5iPDMS had the same contact angle as PDMS of about 106 degrees. Although it was difficult to discern the exact concentration of the initiator (component C) on the iPDMS surface, one could reasonably assume that the amount of initiator integrated into the network of iPDMS was proportional to the feed ratio of the starting components. This assumption is supported by the following data.

Figure 3:
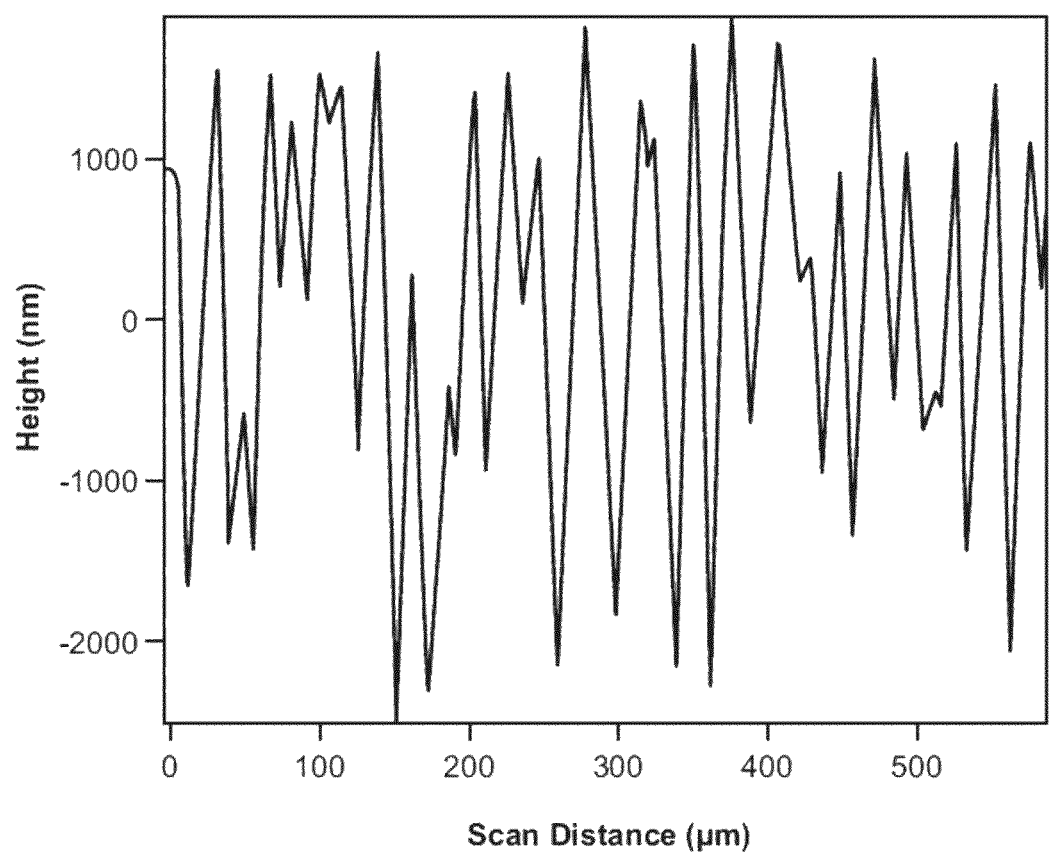
FIG. 3 shows a representative profiler scan of a $10^{-3}$iPDMS surface after the relayed surface-initiated polymerization (SIP) performed in FIG. 1 using 1H,1H,2H,2H-perfluorodecyl methacrylate. The height of the resulting copolymers from the SIP strategy was up to 3 μm.

FIG. 2A-F are representative SEM and contact angle images of 0.5iPDMS and $10^{-3}$iPDMS after the relayed SIP surface modification. Although difficult to quantify, the density difference between these two samples is apparent. The 0.5iPDMS sample was covered with entangled polymer lines (about 500 nm wide), while the $10^{-3}$iPDMS sample was covered with individual dots sized from 100 to 500 nm in diameter and the height for these dots were up to 3 μm measured by a surface profiler (FIG. 3). This initiator density difference was consistent with the contact angle results of the two iPDMS samples after the first SIP. The 0.5iPDMS sample had a contact angle at 57 degrees, which agrees well with that of a poly(OEGMA) surface from a dense initiator surface (Ma, H. W.; Li, D. J.; Sheng, X.; Zhao, B.; Chilkoti, A. Langmuir 2006, 22, 3751-3756). The $10^{-3}$iPDMS has a contact angle of 99 degrees, close to that of PDMS, indicating a low density coverage of poly(OEGMA) chains. This poly (OEGMA) density difference was further supported by XPS characterization: the level of Br signal of the $10^{-3}$iPDMS and 0.5iPDMS samples after addition of initiator moiety in S3 (FIG. 1) was 0.1 atom % and 4.6 atom %, respectively. Note the decrease of terminal Br signal in Table 3 after the first and second SIPs (0.1 atom % to 0%; or from 4.6 atom % to 0.1 atom %). This was a common phenomenon in SIP and was due to: 1) the loss of Br groups during the SIP process, and 2) the Br was buried underneath the top polymer layer and not detected by XPS.

However, after the second run of SIP, the $10^{-3}$iPDMS and 0.5iPDMS samples had very similar surface chemistry as determined by XPS (Table 3). This result was surprising as it would be expected that a higher Si signal would result from the surface of $10^{-3}$iPDMS sample since most of the surface was not covered by poly(FMA). Meanwhile, it is reasonable that the Si signal was greatly reduced (from 27 atom % to 0.7 atom %) for the 0.5iPDMS sample as most of its surface was covered by poly(FMA) (FIG. 2A). To further explore the unexpected XPS result from the $10^{-3}$iPDMS, the relayed SIP process was applied to a control sample of PDMS without initiator and the surface chemistry characterized by XPS. The PDMS sample after the first and second SIP had a reduced Si signal (from 23 atom % to 14 atom %) and increased F signal (from 0 to 23 atom %), which was attributed to the entrapment of monomer FMA into the PDMS networks by the minor swollen effect induced by dimethylformamide (DMF), the solvent used in the relayed SIP process. This may be a factor in the $10^{-3}$iPDMS sample having such a low Si signal.

Figure 6:
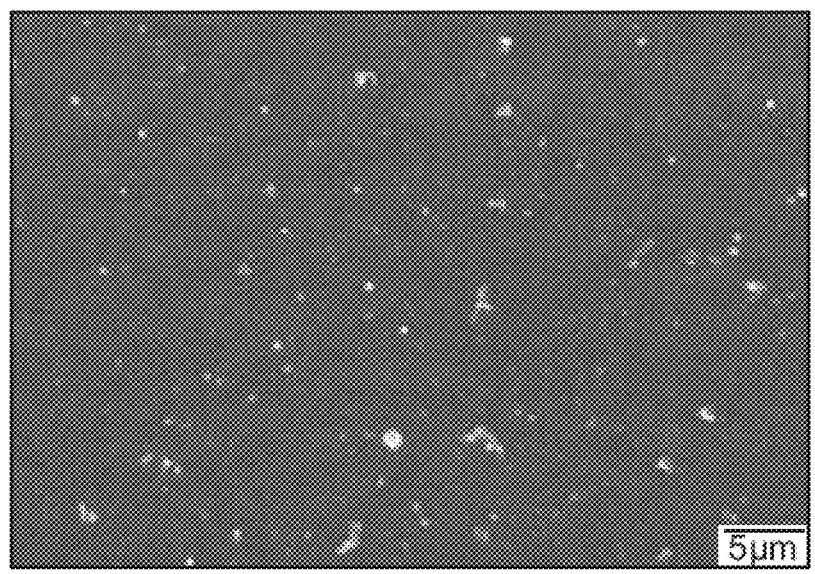
FIG. 6 shows the scanning electron microscope image of $10^{-6}$iPDMS after relayed SIP of 1H,1H,2H,2H-perfluorodecyl methacrylate (FMA). The number of copolymers from the SIP strategy is much less than the $10^{-3}$iPDMS in FIG. 2, panel D.

Nevertheless, a superhydrophobic surface (with a static contact angle >150 degrees and sliding angle at about 1.5 degrees) was only created from $10^{-3}$iPDMS after the second SIP, even though the $10^{-3}$iPDMS and 0.5iPDMS showed similar XPS results after the second SIP. The 0.5iPDMS has a contact angle of 126 degrees, close to that of poly(FMA) Surface after one SIP.[17] Thus, the ultra low initiator density is one of the key conditions (i.e., $10^{-3}$iPDMS but not the $10^{-6}$iPDMS, which had a contact angle at 106 degrees close to that of unmodified iPDMS, see FIG. 6 for the SEM image of $10^{-6}$iPDMS after relayed SIP). Table 3, below, shows the contact angle and XPS results of the initiator integrated PDMS (iPDMS) surfaces after each step of the relayed surface-initiated polymerization (with oligo(ethylene glycol) methacrylate (OEGMA) and 1H,1H,2H,2H-perfluorodecyl methacrylate (FMA) as the first and second monomer, respectively).

TABLE 3

| Initiator | | Angle[b] | XPS[c] | | | | |
|---|---|---|---|---|---|---|---|
| (C) | Status[a] | (degrees) | C 1s | O 1s | Si 2p | Br 3d | F 1s |
| 0 d | S1 | 106 | 49.4 | 27.2 | 22.4 | 0 | / |
|  | S2 | 117 | 43.9 | 18.4 | 14.4 | 0 | 23.3 |
| 0.5 | S1 | 106 | 50.4 | 22.8 | 26.7 | 0.1 | 0 |

TABLE 3-continued

| Initiator | | Angle[b] | XPS[c] | | | | |
|---|---|---|---|---|---|---|---|
| (C) | Status[a] | (degrees) | C 1s | O 1s | Si 2p | Br 3d | F 1s |
|  | S2 | 57 | 28.5 | 66.4 | 5.1 | 0 | / |
|  | S3[e] | 74 | 63.9 | 16.4 | 9.5 | 4.6 | / |
|  | S4 | 126 | 42.1 | 5.8 | 0.7 | 0.1 | 51.3 |
| $10^{-3}$ | S1 | 106 | 50.0 | 26.3 | 23.6 | 0 | / |
|  | S2 | 99 | 52.0 | 27.4 | 20.6 | 0 | / |
|  | S3 | 105 | 50.6 | 27.4 | 21.9 | 0.1 | / |
|  | S4 | 155 | 41.5 | 5.2 | 0.4 | 0.1 | 52.9 |

[a]S1 stands for step 1, see FIG. 1 for details.
[b]Average values from 3 different locations, SE <± 3 degrees.
[c]Atom % was based on the survey scan of Br 3d (71 eV), Si 2p (102 eV), C 1s (285 eV), O 1s (532 eV), and F 1s (690 eV). Average values from 3 different locations, SE <± 0.4 eV,
d Sample was PDMS.
[e]Sample had 5.6% N 1s (399 eV) due to Et$_3$N, which was used as catalyst in the S3.

The relayed SIP strategy is required to generate the superhydrophobicity on iPDMS. A control experiment was conducted using SIP and FMA on 0.5iPDMS surface (FIG. 2G-I). After 4 hours of SIP, the surface was covered with individual dots similar to that in FIGS. 2D and 1E but with smaller size, and was not superhydrophobic. Longer SIP duration (up to 8 hours) resulted in similar surface morphology and contact angles, which was attributed to the difficulties in running SIP for longer duration (He, J., et al., Macromolecules 2007, 40, 3090-3096). In the relayed SIP process, the first SIP prepared a post to support the second SIP, which was a vertical direction growth. The second SIP provided an effective way to realized lateral expansion. The duration of the first and second SIP was, however, not critical as long as a decent (>200 nm laterally and >1000 nm vertically) tree-size was achieved.

Figure 4:
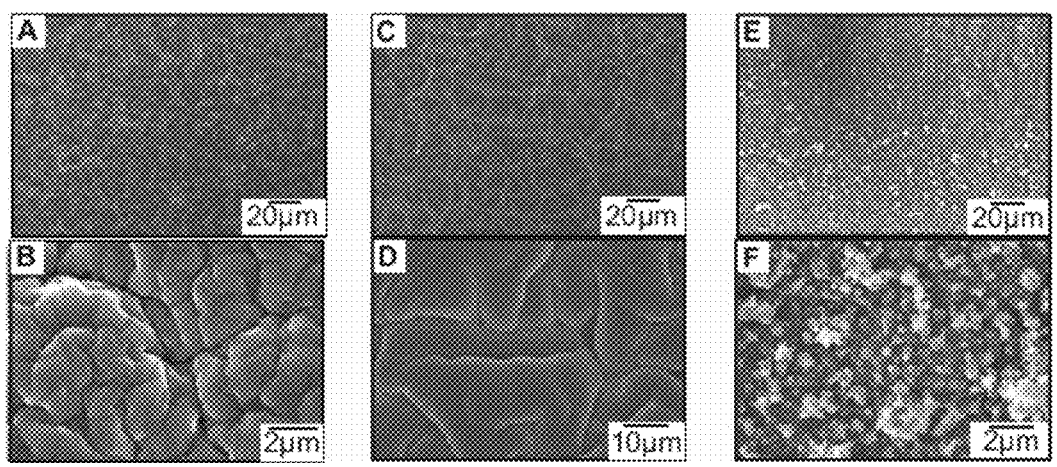
FIG. 4, panels (A)-(F), show representative scanning electron microscope images for samples after the relayed SIP. For all samples, oligo(ethylene glycol) methacrylate (OEGMA) and 1H,1H,2H,2H-perfluorodecyl methacrylate (FMA) were used as the first and second monomer, respectively. Panels (A) and (B) show 0.5iPDMS after 1 hour of the first SIP and 2 hours of the second SIP. The resulting contact angle was 130 degrees. Panels (C) and (D) show 0.5iPDMS after 4 hours of the first SIP and 2 hours of the second SIP. The resulting contact angle was 130 degrees. Panels (E) and (F) show $10^{-3}$iPDMS after 2 hours of the first SIP and 6 h of the second SIP. The resulting contact angle was 150 degrees.

The duration of the first and second SIP was varied from 1 hour to 8 hours for all the five iPDMS samples. It was observed that the surface morphology was very diverse, although no conversion from a hydrophobic surface to a superhydrophobic surface was observed. For example, FIG. 4B, FIG. 2B and FIG. 4D show SEM images for the 0.5iPDMS samples after the first SIP with different durations of 1 h, 2 h and 4 h, respectively. Although the morphology was different, all had a similar contact angle of 126 degrees or 130 degrees. In addition, comparing FIG. 2E with FIG. 4F, the density of poly(OEGMA-FMA) trees increased as the second SIP duration increased from 2 h to 6 h. However, these $10^{-3}$iPDMS samples also shared similar contact angles at 150 degrees and 155 degrees. Thus, the effect of the SIP duration on the contact angles of water is limited.

Example 4

Figure 5:
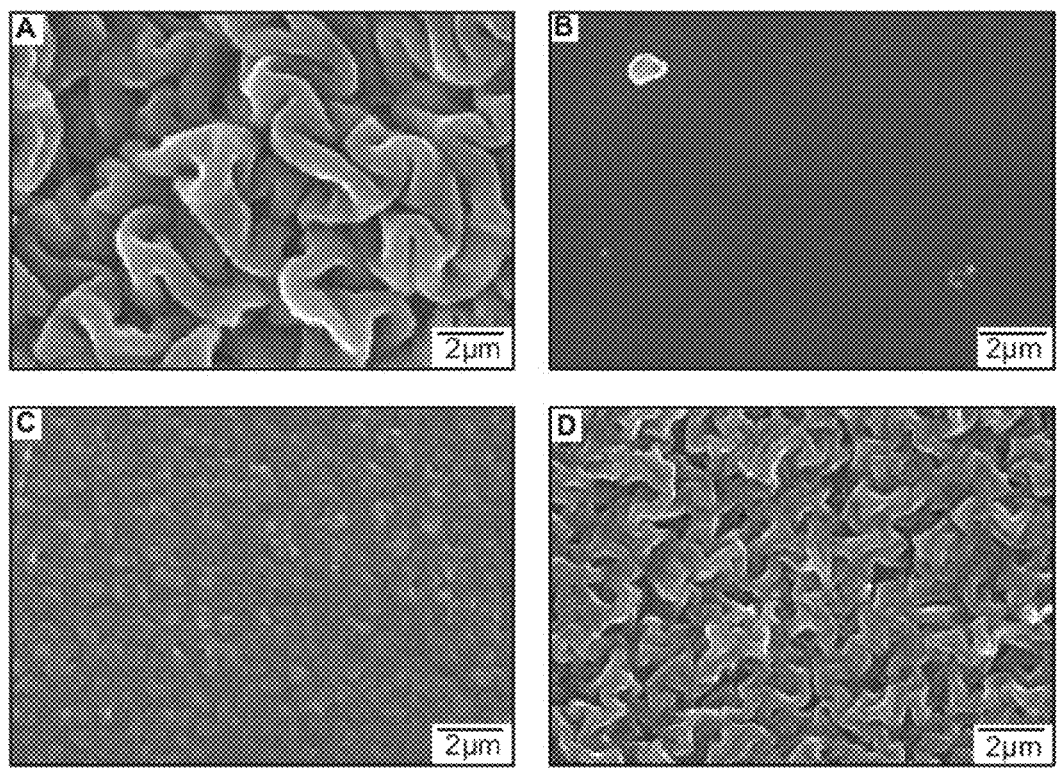
FIG. 5, panels (A)-(D), show scanning electron microscope (SEM) images of the initiator integrated PDMS (iPDMS) surfaces after the relayed surface-initiated polymerization (SIP). Panel (A) shows hydroxyethyl methacrylate (HEMA) as the second monomer for 0.5iPDMS. Panel (B) shows HEMA as the second monomer for $10^{-3}$iPDMS. Panel (C) shows methyl methacrylate (MMA) as the second monomer for 0.5iPDMS. Panel (D) shows OEGMA as the second monomer for 0.5iPDMS. The first monomer was OEGMA in all samples.

Comparison of Methyl Methacrylate (MMA), OEGMA, and Hydroxyethyl Methacrylate (HEMA), as the Monomer to Replace FMA The monomer FMA applied in the second SIP process was also critical in preparing superhydrophobic iPDMS surfaces when compared to methyl methacrylate (MMA), OEGMA, and hydroxyethyl methacrylate (HEMA) as the second polymer layer. FMA acted both by lowering the surface energy with poly(FMA) and by generating a surface morphology with hierarchical scale roughness. For comparison, three other monomers were used, namely, methyl methacrylate (MMA), OEGMA, and hydroxyethyl methacrylate (HEMA), as the monomer to replace FMA in the second SIP process while the conditions for S1 to S3 were maintained the same as before (FIG. 5). Previously the contact angles of surfaces with poly(MMA), poly(HEMA) and poly(OEGMA) polymer brushes were reported at 70 degrees, 47 degrees (Shah, R. R., et al., *Macromolecules* 2000, 33, 597-605) and about 57 degrees (Ma, H. W.; Li, D. J.; Sheng, X.; Zhao, B.; Chilkoti, A. *Langmuir* 2006, 22, 3751-3756), respectively. We had the contact angles for the 0.5iPDMS samples covered with poly (MMA), poly(HEMA) and poly(OEGMA) at 85 degrees, 39 degrees and 48 degrees, respectively, which were all close to the previous reports.

The patterns (or wrinkles) shown in FIGS. 5A, 4C and 4D were unexpected and different from that in FIG. 2A. The exact mechanism behind the pattern formation was not clear although a possible explanation lies in that the mechanical stress induced by the tethered polymers might play a key role in pattern formation: different monomers resulted in distinctly different surface morphology (or wrinkle) for the 0.5iPDMS samples. These differences in surface morphology may cause the unique behavior of Si signal detected by XPS after the relayed SIP.

For example, with HEMA as the monomer in the second polymerization step, the surface of $10^{-3}$iPDMS sample should have a lower surface coverage of poly(HEMA) than the surface of 0.5iPDMS sample but XPS showed a similar Si signal for these two samples: 10.7% and 11.8%, respectively. This can be attributed to the fact that the 0.5iPDMS sample showed a rougher surface morphology than the $10^{-3}$iPDMS sample, which led to more area of the PDMS surface exposed to XPS detection, thus resulting in an increase of Si signal.

The $10^{-3}$iPDMS sample covered with poly(MMA) had a contact angle of 82 degrees, close to that of 0.5iPDMS sample. However, a significant contact angle increase was observed for the $10^{-3}$iPDMS samples covered with poly (HEMA) and poly(OEGMA) at 67 degrees and 72 degrees, respectively. The hydrophilicity of these three samples indicated the consequence of the surface chemistry resulting from FMA. The monomer FMA is also unique in that the $10^{-3}$iPDMS samples with FMA as the second monomer (FIG. 2E) having a different surface morphology from the $10^{-3}$iPDMS samples with the other three tested monomers (FIG. 5B for HEMA). The surface of MMA and OEGMA were also featureless (data not shown). Table 4, below, shows the contact angle and XPS results of the initiator integrated PDMS (iPDMS) surfaces with different monomers in the second surface-initiated polymerization (SIP) process.

TABLE 4

| Monomer | Initiator (C) | Angle[a] (degrees) | XPS[b] | | | |
|---|---|---|---|---|---|---|
| | | | C 1s | O 1s | Si 2p | F 1s |
| None[c] | 0.5[d] | 106 | 50.4 | 22.8 | 26.7 | / |
| | $10^{-3}$ | 106 | 50.0 | 26.4 | 23.6 | / |
| FMA | 0.5 | 126 | 42.1 | 5.8 | 0.7 | 51.3 |
| | $10^{-3}$ | 155 | 41.5 | 5.2 | 0.4 | 52.9 |
| MMA | 0.5 | 85 | 58.7 | 24.5 | 16.8 | / |
| | $10^{-3}$ | 82 | 63.4 | 24.9 | 11.7 | / |
| OEGMA | 0.5 | 48 | 59.2 | 28.9 | 11.9 | / |
| | $10^{-3}$ | 72 | 60.5 | 30.8 | 8.7 | / |
| HEMA | 0.5 | 39 | 61.2 | 27.0 | 11.8 | / |
| | $10^{-3}$ | 67 | 61.4 | 28.2 | 10.7 | / |

[a] Average values from 3 different locations, SE <± 3 degrees.
[b] Atom % was based on the survey scan of Si 2p (102 eV), C 1s (285 eV), O 1s (532 eV), and F is (690 eV). Average values from 3 different locations, SE <± 0.4 eV.
[c] Sample was iPDMS before the first SIP process.
[d] Sample had Br 3d (71 eV) intensity at 0.1 atom %.

EQUIVALENTS

The present disclosure is not to be limited in terms of the particular embodiments described in this application, which are intended as single illustrations of individual aspects of. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An article comprising a hydrophobic coating having a contact angle of at least about 150 degrees, wherein the coating comprises:
   a polymer substrate comprising poly(dimethyl) siloxane (PDMS) and a first linker incorporated therein at a specified surface density of from about $3\times10^{-4}$ to about $9\times10^{-8}$ units per $nm^2$;
   a first polymer layer in contact with said first linker;
   a second linker in contact with said first polymer layer; and
   a second polymer layer in contact with said second linker;
   wherein the article is selected from the group consisting of a microfluidic device, wherein the microfluidic device comprises at least one channel disposed thereon, a lab-on-a-chip, a boat, and a marine monitoring device.

2. The article of claim 1 wherein the article is protein resistant.

3. The article of claim 1 wherein the article is marine antifoulable.

4. The article of claim 1, wherein the first polymer layer is bonded to the first linker by a carbon-carbon bond.

5. The article of claim 1, wherein the second linker is bonded to the first polymer layer by an ester bond.

6. The article of claim 1, wherein the second polymer layer is bonded to the second linker by a carbon-carbon bond.

7. The article of claim 1, wherein the first linker comprises an alkyl group with a terminal functional group.

8. The article of claim 1, wherein the first linker comprises a linear (C6-C12) alkyl group with a terminal alpha-haloester group.

9. The article of claim 1, wherein the first polymer layer comprises polyethylene glycol.

10. The article of claim 1, wherein the second linker comprises a carbonyl group.

11. The article of claim 1, wherein the second polymer layer comprises fluorine.

12. A microfluidic device comprising:
   at least one channel disposed thereon; and
   a hydrophobic coating having a contact angle of at least about 150 degrees, wherein the coating comprises:
   a polymer substrate comprising poly(dimethyl) siloxane (PDMS) and a first linker incorporated therein at a specified surface density of from about $3\times10^{-4}$ to about $9\times10^{-8}$ units per $nm^2$;
   a first polymer layer in contact with said first linker;
   a second linker in contact with said first polymer layer; and
   a second polymer layer in contact with said second linker.

13. A method for making a hydrophobic coating having a contact angle of at least about 150 degrees, said method comprising:
   1) polymerizing a mixture comprising a poly(dimethyl-methylvinylsiloxane) prepolymer, poly(dimethyl-methylhydrogensiloxane) precursors and undec-10-enyl-2-bromo-2-methylpropanoate, under thermal conditions to form a polymer substrate;
   2) contacting oligo(ethylene glycol) methacrylate with said polymer substrate under first polymerizing conditions to provide a first polymer layer bound to the polymer substrate through the undec-10-enyl-2-bromo-2-methylpropanoate;
   3) contacting 2-bromoisobutyryl bromide with said first polymer layer under reaction conditions to provide a reactive surface; and
   4) contacting 1H, 1H, 2H, 2H-perfluorodecyl methacrylate with said reactive surface under second polymerizing conditions to provide the hydrophobic coating.

14. The method of claim 13, wherein the first polymerizing conditions comprise metal catalyzed polymerization.

15. The method of claim 13, wherein the second polymerizing conditions comprise metal catalyzed polymerization.

16. The method of claim 13, wherein the ratio of poly(dimethyl-methylvinylsiloxane) prepolymer,and poly(dimethyl-methylhydrogensiloxane) precursors to undec-10-enyl-2-bromo2-methylpropanoate is about $10:1:10^{-3}$.

17. The method of claim 13, wherein the surface density of undec-10-enyl-2-bromo-2-methylpropanoate is about $1.0\times10^{-5}$ units per $nm^2$.

18. The method of claim 13, wherein the first polymerizing conditions comprise heating the monomer and linker to a temperature of from about 25° C. to about 90° C.

19. The method of claim 13, wherein the reaction conditions comprise acetylation conditions.

20. The method of claim 13, wherein the second polymerizing conditions comprise heating the monomers to about 80° C.

* * * * *

UNITED STATES PATENT AND TRADEMARK OFFICE
CERTIFICATE OF CORRECTION

PATENT NO. : 8,614,003 B2
APPLICATION NO. : 13/739638
DATED : December 24, 2013
INVENTOR(S) : Ma et al.

It is certified that error appears in the above-identified patent and that said Letters Patent is hereby corrected as shown below:

On Title Page 2, in Item (56), under "OTHER PUBLICATIONS", in Column 1, Line 27, delete ""CHydrophilic" and insert -- "Hydrophilic --, therefor.

On Title Page 2, in Item (56), under "OTHER PUBLICATIONS", in Column 1, Line 45, delete "Science 2000," and insert -- Science, 2000, --, therefor.

On Title Page 2, in Item (56), under "OTHER PUBLICATIONS", in Column 1, Line 52, delete "Langmuir;" and insert -- Langmuir, --, therefor.

On Title Page 2, in Item (56), under "OTHER PUBLICATIONS", in Column 2, Line 71, delete "Chem," and insert -- Chem., --, therefor.

On Title Page 3, in Item (56), under "OTHER PUBLICATIONS", in Column 1, Line 9, delete "Langmuir" and insert -- Langmuir, --, therefor.

On Title Page 3, in Item (56), under ""OTHER PUBLICATIONS", in Column 1, Lines 13-14, delete "m ultiple-step" and insert -- multiple-step --, therefor.

In the Specifications

In Column 4, Line 8, delete "Et3N" and insert -- $Et_3N$ --, therefor.

In Column 11, Line 5, delete "with to said" and insert -- with said --, therefor.

In Column 15, Line 16, delete "superhydrophobi" and insert -- superhydrophobic --, therefor.

In Column 16, Line 4, delete "HITACH-54800" and insert -- HITACHI-S4800 --, therefor.

Signed and Sealed this
Sixth Day of May, 2014

Michelle K. Lee
*Deputy Director of the United States Patent and Trademark Office*

CERTIFICATE OF CORRECTION (continued)
U.S. Pat. No. 8,614,003 B2

In Column 17, in Table 2, Line 1, delete "$10^{-1}$PDMS" and insert -- $10^{-1}$iPDMS --, therefor.

In Column 19, Line 47, delete "Surface" and insert -- surface --, therefor.

In Column 20, Line 15, delete "d Sample" and insert -- $^d$ Sample --, therefor.

In the Claims

In Column 23, Line 52, in Claim 2, delete "1" and insert -- 1, --, therefor.

In Column 23, Line 54, in Claim 3, delete "1" and insert -- 1, --, therefor.

In Column 24, Line 4, in Claim 8, delete "(C6-C12)" and insert -- ($C_6$-$C_{12}$) --, therefor.

In Column 24, Line 47, in Claim 16, delete "prepolymer,and" and insert -- prepolymer, and --, therefor.

In Column 24, Lines 48-49, in Claim 16, delete "undec-10-enyl-2-bromo2-methylpropanoate" and insert -- undec-10-enyl-2-bromo-2-methylpropanoate --, therefor.